(12) United States Patent
Geiss et al.

(10) Patent No.: US 9,615,012 B2
(45) Date of Patent: Apr. 4, 2017

(54) USING A SECOND CAMERA TO ADJUST SETTINGS OF FIRST CAMERA

(71) Applicant: Google Inc., Mountain View, CA (US)

(72) Inventors: Ryan Burgess Geiss, San Jose, CA (US); Marc Levoy, Mountain View, CA (US); Roman Lewkow, San Jose, CA (US)

(73) Assignee: Google Inc., Mountain View, CA (US)

( * ) Notice: Subject to any disclaimer, the term of this patent is extended or adjusted under 35 U.S.C. 154(b) by 659 days.

(21) Appl. No.: 14/041,905

(22) Filed: Sep. 30, 2013

(65) Prior Publication Data

US 2015/0092066 A1    Apr. 2, 2015

(51) Int. Cl.
| | | |
|---|---|---|
| *H04N 17/00* | (2006.01) | |
| *H04N 5/225* | (2006.01) | |
| *H04N 5/235* | (2006.01) | |
| *H04N 13/02* | (2006.01) | |

(52) U.S. Cl.
CPC ........... *H04N 5/2258* (2013.01); *H04N 5/235* (2013.01); *H04N 13/0239* (2013.01); *H04N 13/0296* (2013.01)

(58) Field of Classification Search
CPC ............. H04N 5/2258; H04N 13/0296; H04N 13/0239; H04N 5/235
USPC .......................................................... 348/180
See application file for complete search history.

(56) References Cited

U.S. PATENT DOCUMENTS

| | | | |
|---|---|---|---|
| 4,644,582 A | 2/1987 | Morishita et al. | |
| 5,781,308 A | 7/1998 | Fujii et al. | |
| 5,828,793 A | 10/1998 | Mann | |
| 5,926,190 A | 7/1999 | Turkowski et al. | |
| 6,061,091 A | 5/2000 | Van De Poel et al. | |
| 6,075,905 A | 6/2000 | Herman et al. | |
| 6,101,285 A | 8/2000 | Fan | |
| 6,204,881 B1 | 3/2001 | Ikeda et al. | |
| 6,539,116 B2 | 3/2003 | Takaoka | |
| 6,693,718 B1 | 2/2004 | Takaoka | |
| 6,925,121 B1 | 8/2005 | Komiya et al. | |
| 6,975,755 B1 | 12/2005 | Baumberg | |
| 7,098,946 B1 | 8/2006 | Koseki et al. | |

(Continued)

FOREIGN PATENT DOCUMENTS

| | | |
|---|---|---|
| JP | 2005-045804 | 2/2005 |
| JP | 2011134221 | 7/2011 |

(Continued)

OTHER PUBLICATIONS

Low, Aloysius; CNET article titled "Corephotonics' dual-camera tech will change smartphone imaging" dated Feb. 27, 2014.

(Continued)

*Primary Examiner* — William C Vaughn, Jr.
*Assistant Examiner* — Naod Belai
(74) *Attorney, Agent, or Firm* — McDonnell Boehnen Hulbert & Berghoff LLP

(57) ABSTRACT

A device may operate a first image-capture system to capture first image data of a scene. While the first image-capture system is capturing the first image data, the device may operate a second image-capture system to determine an updated value for the first image setting, and send an instruction to the first image-capture system that indicates to use the updated value for the first image setting to continue to capture the first image data.

24 Claims, 17 Drawing Sheets

(56) References Cited

U.S. PATENT DOCUMENTS

| | | |
|---|---|---|
| 7,173,666 B1 | 2/2007 | Masaki et al. |
| 7,239,805 B2 | 7/2007 | Uyttendaele et al. |
| 7,626,614 B1 | 12/2009 | Marcu |
| 7,667,764 B2 | 2/2010 | Kamon et al. |
| 7,840,093 B2 | 11/2010 | Fu et al. |
| 7,903,168 B2 | 3/2011 | Pillman et al. |
| 7,924,321 B2 | 4/2011 | Nayar et al. |
| 7,940,325 B2 | 5/2011 | Kim et al. |
| 7,944,485 B2 | 5/2011 | Ovsiannikov |
| 8,023,004 B2 | 9/2011 | Asoma |
| 8,059,891 B2 | 11/2011 | Li et al. |
| 8,072,507 B2 | 12/2011 | Fuh et al. |
| 8,094,211 B2 | 1/2012 | Kwon et al. |
| 8,134,589 B2 | 3/2012 | Border et al. |
| 8,200,020 B1 | 6/2012 | Geiss et al. |
| 8,208,048 B2 | 6/2012 | Lin et al. |
| 8,237,813 B2 | 8/2012 | Garten |
| 8,406,560 B2 | 3/2013 | Lee et al. |
| 8,411,962 B1 | 4/2013 | Geiss et al. |
| 8,446,481 B1 | 5/2013 | Geiss et al. |
| 8,553,106 B2 | 10/2013 | Scarff |
| 8,576,295 B2 | 11/2013 | Ito |
| 8,866,927 B2 | 10/2014 | Levoy et al. |
| 8,866,928 B2 | 10/2014 | Geiss et al. |
| 8,885,976 B1 | 11/2014 | Kuo et al. |
| 2001/0019362 A1 | 9/2001 | Nakamura et al. |
| 2003/0002750 A1 | 1/2003 | Ejiri et al. |
| 2003/0095192 A1 | 5/2003 | Horiuchi |
| 2003/0117511 A1* | 6/2003 | Belz ............ H04N 1/0044 348/333.11 |
| 2004/0160525 A1 | 8/2004 | Kingetsu et al. |
| 2004/0227840 A1 | 11/2004 | Houlberg |
| 2005/0147322 A1 | 7/2005 | Saed |
| 2005/0163380 A1 | 7/2005 | Wang et al. |
| 2005/0239104 A1 | 10/2005 | Furea et al. |
| 2005/0243176 A1 | 11/2005 | Wu et al. |
| 2006/0269155 A1 | 11/2006 | Tener et al. |
| 2006/0291740 A1 | 12/2006 | Kim et al. |
| 2007/0003261 A1 | 1/2007 | Yamasaki |
| 2007/0147824 A1 | 6/2007 | Hamamura |
| 2008/0024614 A1* | 1/2008 | Li ............ H04N 5/225 348/207.99 |
| 2008/0030592 A1 | 2/2008 | Border et al. |
| 2008/0094486 A1 | 4/2008 | Fuh et al. |
| 2008/0253758 A1 | 10/2008 | Yap et al. |
| 2008/0278633 A1 | 11/2008 | Tsoupko-Sitnikov et al. |
| 2008/0298717 A1 | 12/2008 | Lee |
| 2009/0040364 A1 | 2/2009 | Rubner |
| 2009/0059033 A1* | 3/2009 | Shimada ............ B25J 19/022 348/229.1 |
| 2009/0123082 A1 | 5/2009 | Atanssov et al. |
| 2009/0185622 A1 | 7/2009 | Itoh et al. |
| 2009/0207258 A1 | 8/2009 | Jang et al. |
| 2009/0222625 A1 | 9/2009 | Ghosh et al. |
| 2009/0231445 A1 | 9/2009 | Kanehiro |
| 2009/0231449 A1 | 9/2009 | Tzur et al. |
| 2009/0231468 A1 | 9/2009 | Yasuda |
| 2009/0244301 A1 | 10/2009 | Border et al. |
| 2009/0268963 A1 | 10/2009 | Kang et al. |
| 2009/0274387 A1 | 11/2009 | Jin |
| 2009/0322901 A1 | 12/2009 | Subbotin et al. |
| 2010/0066858 A1 | 3/2010 | Asoma |
| 2010/0103194 A1 | 4/2010 | Chen et al. |
| 2010/0150473 A1 | 6/2010 | Kwon et al. |
| 2010/0157078 A1 | 6/2010 | Atanassov et al. |
| 2010/0165075 A1 | 7/2010 | Chou et al. |
| 2010/0166337 A1 | 7/2010 | Murashita et al. |
| 2010/0182444 A1* | 7/2010 | Kroepfl ............ H04N 5/2351 348/222.1 |
| 2010/0265357 A1 | 10/2010 | Liu et al. |
| 2010/0277631 A1 | 11/2010 | Sugiyama |
| 2010/0321539 A1 | 12/2010 | Ito |
| 2010/0328490 A1 | 12/2010 | Kurane et al. |
| 2010/0328491 A1 | 12/2010 | Ovsiannikov |
| 2011/0047155 A1 | 2/2011 | Sohn et al. |
| 2011/0069200 A1 | 3/2011 | Oh et al. |
| 2011/0085697 A1 | 4/2011 | Clippard et al. |
| 2011/0149111 A1 | 6/2011 | Prentice et al. |
| 2011/0200265 A1 | 8/2011 | Prigent |
| 2011/0222793 A1 | 9/2011 | Ueda et al. |
| 2011/0228993 A1 | 9/2011 | Reilly et al. |
| 2011/0254976 A1 | 10/2011 | Garten |
| 2011/0255786 A1* | 10/2011 | Hunter ............ H04N 5/21 382/190 |
| 2011/0279706 A1 | 11/2011 | Lesiak et al. |
| 2012/0002082 A1* | 1/2012 | Johnson ............ G06T 5/50 348/234 |
| 2012/0002898 A1 | 1/2012 | Cote et al. |
| 2012/0002899 A1 | 1/2012 | Orr et al. |
| 2012/0044381 A1 | 2/2012 | Jannard et al. |
| 2012/0050557 A1 | 3/2012 | Atanassov et al. |
| 2012/0075489 A1 | 3/2012 | Nishihara |
| 2012/0105672 A1* | 5/2012 | Doepke ............ H04N 5/2353 348/229.1 |
| 2012/0105681 A1 | 5/2012 | Morales |
| 2012/0127348 A1 | 5/2012 | Li |
| 2012/0189197 A1 | 7/2012 | Li et al. |
| 2012/0201426 A1 | 8/2012 | Jasinski et al. |
| 2012/0201450 A1 | 8/2012 | Bryant et al. |
| 2012/0201456 A1 | 8/2012 | El-Mahdy et al. |
| 2012/0219235 A1 | 8/2012 | Solhusvik et al. |
| 2012/0249828 A1 | 10/2012 | Sun |
| 2012/0287310 A1* | 11/2012 | Fujii ............ G03B 7/093 348/239 |
| 2012/0308126 A1 | 12/2012 | Hwang et al. |
| 2012/0314100 A1 | 12/2012 | Frank |
| 2013/0027606 A1* | 1/2013 | Voss ............ H04N 5/2258 348/349 |
| 2013/0033616 A1 | 2/2013 | Kaizu et al. |
| 2013/0083216 A1 | 4/2013 | Jiang et al. |
| 2013/0100314 A1 | 4/2013 | Li et al. |
| 2013/0121569 A1 | 5/2013 | Yadav |
| 2013/0128075 A1* | 5/2013 | Lukac ............ H04N 5/2353 348/229.1 |
| 2013/0329092 A1 | 12/2013 | Wong |
| 2014/0042233 A1 | 2/2014 | Yang |
| 2014/0219578 A1 | 8/2014 | Peng et al. |
| 2014/0337791 A1* | 11/2014 | Agnetta ............ G06F 3/0481 715/784 |

FOREIGN PATENT DOCUMENTS

| | | |
|---|---|---|
| JP | 2012-029029 | 2/2012 |
| JP | 2013046348 | 3/2013 |
| KR | 10-2007-0085867 | 8/2007 |
| KR | 10-0911814 | 8/2009 |
| KR | 10-2010-0061318 | 6/2010 |
| KR | 10-2010-0086987 | 8/2010 |
| WO | 98/02844 | 1/1998 |
| WO | 2004/098167 | 11/2004 |
| WO | 2010147609 | 12/2010 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

Notice of Allowance for U.S. Appl. No. 14/455,444 mailed Oct. 2, 2014, 9 pages.

Office Action for U.S Appl. No. 13/902,253 mailed Dec. 2, 2014, 9 pages.

Office Action for U.S Appl. No. 13/902,267 mailed Dec. 12, 2014, 12 pages.

Jin et al., "Face Detection Using Improved LBP Under Bayesian Framework," Proceedings of the Third International Conference on Image and Graphics (ICIG'04), 2004, pp. 1-4.

(56) References Cited

OTHER PUBLICATIONS

Mandava et al., "Speckle Noise Reduction Using Local Binary Pattern," 2nd International Conference on communication, Computing & Security (ICCCS-2012), Procedia Technology, 2012, pp. 574-581, vol. 6.
Office Action for U.S. Appl. No. 13/743,565 mailed Sep. 4, 2014, 20 pages.
Nayar et al., "Adaptive Dynamic Range Imaging: Optical Control of Pixel Exposures Over Space and Time," Proceedings of the Ninth IEEE International Conference on Computer vision (ICCV03), 2003, pp. 1-8.
Duan et al., Tone-mapping High Dynamic Range Images by Novel Histogram Adjustment, Pattern Recognition, 2010, 39 pages, vol. 43, No. 5.
"Exposure (photography)," Wikipedia, the free encyclopedia, Jun. 21, 2012, pp. 1-8 (http://en.wikipedia.org/wiki/Autoexposure#Automatic_exposure).
"JPEG," Wikipedia, the free encyclopedia, Jul. 31, 2012, pp. 1-16 (http://en.wikipedia.org/wiki/JPEG).
"High dynamic range imaging," Wikipedia, the free encyclopedia, Jun. 21, 2012, pp. 1-11 (http://en.wikipedia.orig/wiki/High_dynamic_range_imaging).
"Tone-mapping," Wikipedia, the free encyclopedia, Jun. 21, 2012, pp. 1-10 (http://en.wikipedia.org/wiki/Tone_mapping).
"Metering mode," Wikipedia, the free encyclopedia, Jun. 25, 2012, pp. 1-3 (http://en.wikipedia.org/wiki/Metering_mode).
"YCbCr," Wikipedia, the free encyclopedia, Jul. 31, 2012, pp. 1-5 (http://en.wikipedia.org/wiki/YCbCr).
Lowe, D.G., "Object Recognition from Local Scale-Invariant Features," Proc. of the Internatuional Conference on Computer Vision, Sep. 20-22, 1999, pp. 1150-1157, vol. 2.
Brown, M. & Lowe, D., "Invariant Features from Interest Point Groups," Computer, (2002) p. 253-262, Available at: http://citeseerx.ist.psu.edu/viewdoc/download?doi=10.1.1.735616&rep=rep1&type=pdf.
Winder, S.A.J. and Brown, M., "Learning Local Image Descriptors," Computer Vision and Pattern Recognition, 2007, CVPR '07, IEEE Conference on in Computer Vision and Pattern Recognition, 2007, CVPR '07, IEEE Conference on (Jun. 2007), pp. 1-8, doi:10.1109/CVPR.2007.382971 Key: citeulike:1663569.
Sinha et al., "Feature Tracking and Matching in Video Using Programmable Graphics Hardware," Machine Vision and Applications, DOI 10.1007/s00138-007-0105-z, Nov. 2007.
Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.
Ozuysal et al., "Fast Keypoint Recognition in Ten Lines of Code," Computer Vision and Pattern Recognition, IEEE computer Society Conference on in Computer Vision and Pattern Recognition, 2007, CVPR '07, IEEE Conference on vol. 0 (2007), pp. 1-8, doi:10.1109/CVPR.2007.383123 Key: citeulike:2943111.
Bay et al., "SURF: Speeded Up Robust Features," 9th European Conference on Computer Vision, 2008, pp. 346-359, vol. 110, No. 3.
Ta, Duy-Nguven et al., "SURFTrac: Efficient Tracking and Continuous Object Recognition using Local Feature Descriptors," IEEE Computer Society Conference on Computer Vision and Pattern Recognition, 2009, pp. 2937-2944.
Bauer et al., "Comparing Several Implementations of Two Recently Published Feature Detectors," In Proc. of the International Conference on Intelligent and Autonomous Systems, IAV, Toulouse, France (2007).
SIFT, accessed on Oct. 21, 2011, from Wikipedia, http://en.wikipedia.org/w/index.php?title=Special:Book&bookcmd=download&collection_id=1bf75abdad524091&writer=rl&return_to=Scale-invariant+feature+transform.
SURF, accessed on Oct. 24, 2011, from Wikipedia, http://en.wikipedia.org/wiki/SURF.

Wagner et al., "Real-time detection and tracking for augmented reality on mobile phones," IEEE Trans Vis Comput Graph, May-Jun. 2010, pp. 355-368, vol. 16, No. 3.
SynthCam iPhone, https://sites.google.com/site/marclevoy/Tutorial accessed Oct. 24, 2011.
Karpenko et al., "Digital Video Stabilization and Rolling Shutter Correction using Gyroscopes," Stanford Tech Report CTSR 2011-03, http://graphics.stanford.edu/papers/stabilization/karpenko_gyro.pdf (Sep. 2011).
Gelfand, Natasha, et al., "Multi-exposure imaging on mobile devices," In Proceedings of the international conference on Multimedia, ACM, 2010, pp. 823-826.
International Search Report and Written Opinion for PCT/US2014/011498 mailed Apr. 22, 2014, 11 pages.
Final Office Action. U.S. Appl. No. 13/863,981 mailed Apr. 8, 2014, 26 pages.
International Searching Authority, International Search Report and Written Opinion for PCT/US2013/072638 mailed Mar. 11, 2014, 10 pages.
International Searching Authority, International Search Report and Written Opinion for PCT/US2013/071663 mailed Mar. 13, 2014, 9 pages.
International Searching Authority, International Search Report and Written Opinion for PCT/US2013/72564 mailed Mar. 11, 2014, 13 pages.
International Searching Authority, International Search Report and Written Opinion for PCT/US2013/071459 mailed Mar. 13, 2014, 9 pages.
International Searching Authority, International Search Report and Written Opinion for PCT/US2013/071618 mailed Mar. 3, 2014, 9 pages.
International Searching Authority, International Search Report and Written Opinion for PCT/US2013/072569 mailed Mar. 6, 2014, 9 pages.
Notice of Allowance for U.S. Appl. No. 13/305,389 mailed Feb. 22, 2012, 9 pages.
Notice of Allowance for U.S. Appl. No. 13/458,334 mailed Oct. 11, 2012, 34 pages.
Cyganek, Bogus!aw, "Comparison of nonparametric transformations and bit vector matching for stereo correlation." Combinatorial Image Analysis, 2005, pp. 534-547.
Fife, WadeS. et al., "Improved Census Transforms for Resource-Optimized Stereo Vision," IEEE Transactions on Circuits and Systems for Video Technology, Jan. 2013, vol. 23, No. 1, pp. 60-73.
Hansen, Christian et al., "Chapter 1: The Image Deblurring Problem," Deblurring Images: Matrices, Spectra, and Filtering, SIAM, Philadelphia, 2006, pp. 1-12.
Seemann, Torsten et al., "Structure preserving noise filtering of images using explicit local segmentation." Fourteenth International Conference on Pattern Recognition, IEEE, 1998, vol. 2, pp. 1610-1612.
Zabih et al., "Non-parametric Local Transforms for Computing Visual Correspondence," In Proceedings of European Conference on Computer Vision, Stockholm, Sweden, May 1994, pp. 151-158.
Office Action for U.S. Appl. No. 13/722,519 mailed Feb. 19, 2015, 11 pages.
Office Action for U.S. Appl. No. 14/488,891 mailed Feb. 13, 2015, 6 pages.
Office Action for U.S. Appl. No. 13/847,238 mailed Jan. 2, 2015, 6 pages.
Office Action, U.S. Appl. No. 13/713,720, mailed Apr. 8, 2014, 46 pages.
Office Action for U.S. Appl. No. 13/759,749 mailed Sep. 24, 2014, 38 pages.
International Searching Authority, International Search Report and Written Opinion for International Application No. PCT/US2014/038963 mailed Sep. 17, 2014, 12 pages.
Office Action for U.S. Appl. No. 13/718,533 mailed Apr. 22, 2014, 48 pages.
Notice of Allowance for U.S. Appl. No. 13/718,533 mailed Jul. 18, 2014, 9 pages.
Office Action for U.S. Appl. No. 13/863,981 mailed Oct. 7, 2013, 45 pages.

(56) References Cited

OTHER PUBLICATIONS

Office Action for U.S. Appl. No. 13/849,824 mailed Nov. 5, 2014, 14 pages.
Notice of Allowance for U.S. Appl. No. 13/610,288 mailed Feb. 28, 2013, 31 pages.
Notice of Allowance for U.S. Appl. No. 13/743,565 mailed Dec. 2, 2014, 15 pages.

* cited by examiner

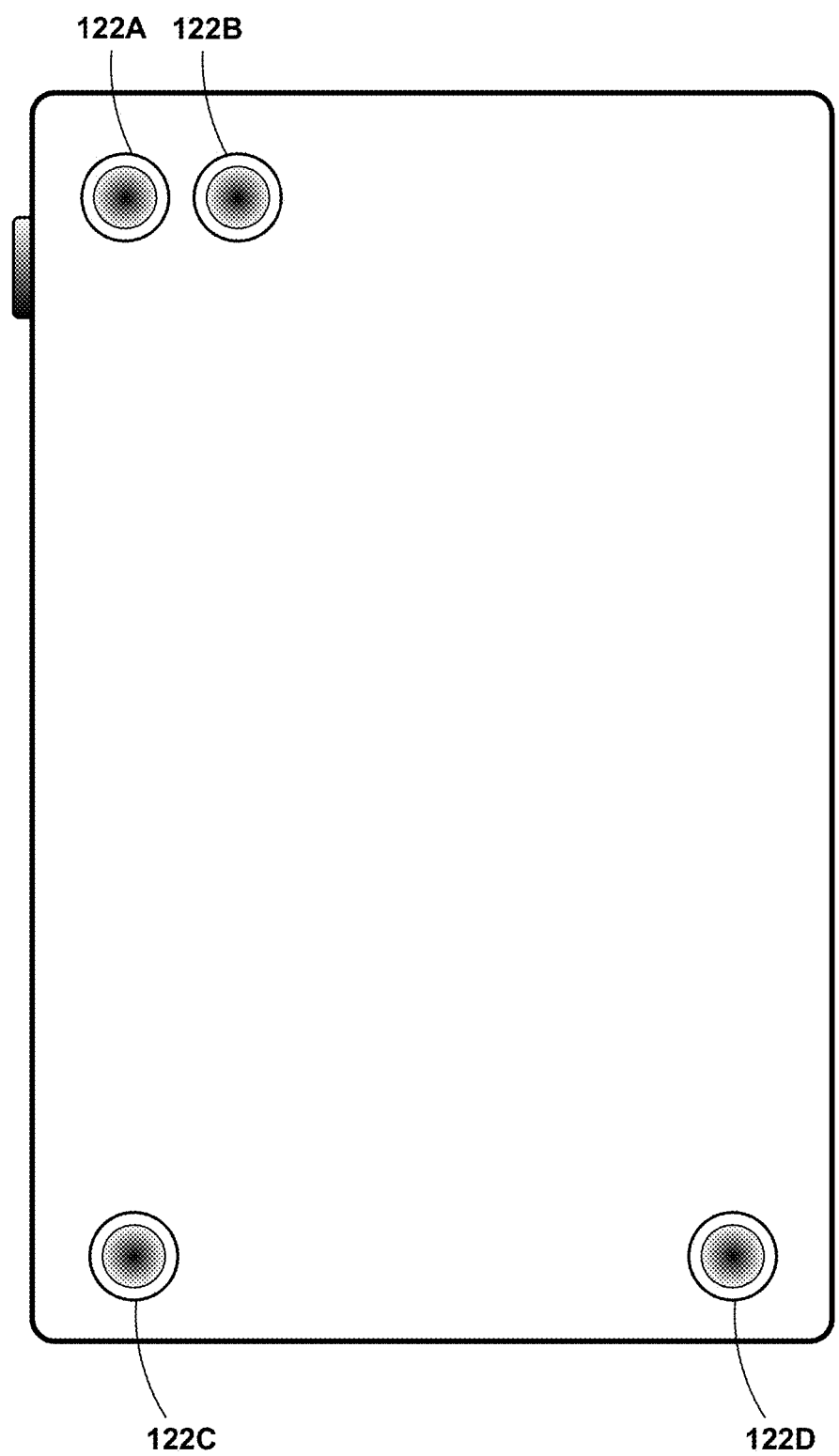

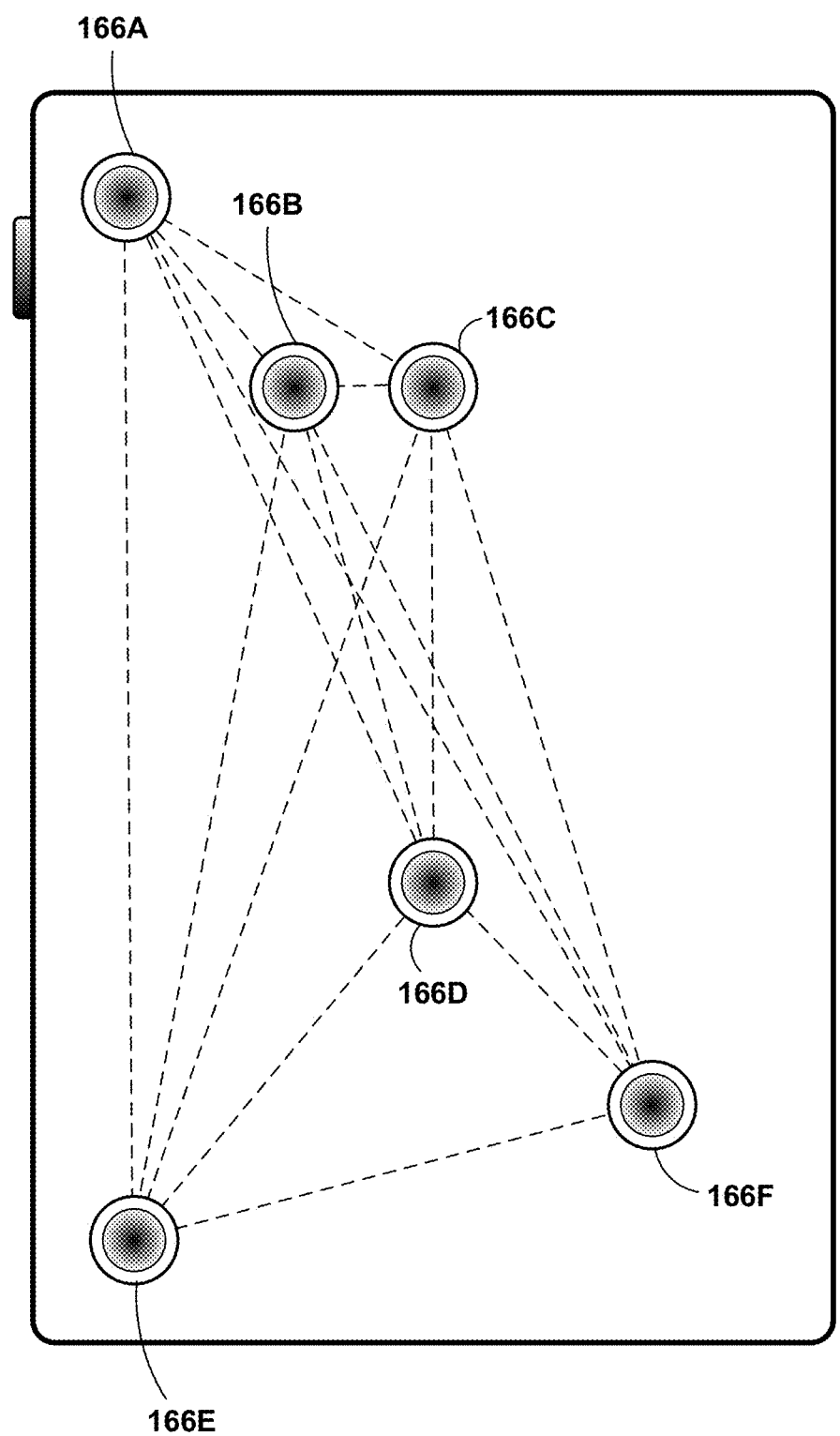

USING A SECOND CAMERA TO ADJUST SETTINGS OF FIRST CAMERA

BACKGROUND

Generally, imaging may refer to capturing and representing the color and brightness characteristics of a real-world environment in a digital format and/or a film format (e.g., in photographs and/or motion video). A large variety of image capture devices exist, thus providing consumers with numerous ways to capturing image data.

As image capture devices, such as cameras, become more popular, such devices may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

SUMMARY

Some digital camera systems do not include a separate sensor system for automated functions such as auto-exposure and autofocus, and thus provide such functions using the same sensor system that is used for image capture. Accordingly, such automated functions can lead to, e.g., portions of video where the exposure settings change rapidly and/or where the video goes out of focus. Accordingly, example embodiments may include two or more camera systems that are oriented in the same direction, such that a second camera can provide such automated functions while a first camera is capturing image data. Such a multi-camera configuration may help to prevent some of the undesirable effects that result when a device is simultaneously using the same image sensor for image capture and an automated image-setting adjustment process.

In one aspect, a method involves: (a) operating, by a computing device, a first image-capture system to capture first image data of a scene, wherein the first image-capture system initially uses a first value for a first image setting to capture the first image data; and (b) while the first image-capture system is capturing the first image data: (i) operating, by the computing device, a second image-capture system to determine an updated value for the first image setting, wherein the first image-capture system and the second image-capture system are arranged on a given device and oriented in substantially the same direction; and (ii) sending an instruction to the first image-capture system that indicates to use the updated value for the first image setting to continue to capture the first image data.

In another aspect, a system includes a control system and two or more image-capture systems that include at least a first and second image-capture systems, wherein the first and second image-capture systems are oriented in substantially the same direction. The control system is configured to: (a) initially operate the first image-capture system to capture first image data using a first value for a first image setting, and (b) while the first image-capture system is capturing the first image data: (i) operate the second image-capture system to determine an updated value for the first image setting; and (ii) cause the first image-capture system to use the updated image value for the first image setting to continue to capture the first image data.

In a further aspect, a non-transitory computer readable medium has stored therein instructions that are executable by a computing device to cause the computing device to perform functions comprising: (a) operating a first image-capture system to capture first image data of a scene, wherein the first image-capture system initially uses a first value for a first image setting to capture the first image data; and (b) while the first image-capture system is capturing the first image data: (i) operating a second image-capture system to determine an updated value for the first image setting, wherein the first image-capture system and the second image-capture system are arranged on a given device and oriented in substantially the same direction; and (ii) sending an instruction to the first image-capture system that indicates to use the updated value for the first image setting to continue to capture the first image data.

In yet a further aspect, a system may include: (a) means for operating a first image-capture system to capture first image data of a scene, wherein the first image-capture system initially uses a first value for a first image setting to capture the first image data; and (b) means for, while the first image-capture system is capturing the first image data: (i) operating a second image-capture system to determine an updated value for the first image setting, wherein the first image-capture system and the second image-capture system are arranged on a given device and oriented in substantially the same direction; and (ii) sending an instruction to the first image-capture system that indicates to use the updated value for the first image setting to continue to capture the first image data.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 1B shows a digital camera device with an arrangement of four cameras oriented in the same direction, in accordance with an example embodiment.

FIG. 1D shows a digital camera device with an arrangement of six cameras oriented in the same direction, in accordance with an example embodiment.

DETAILED DESCRIPTION

I. Overview

Figure 1A:
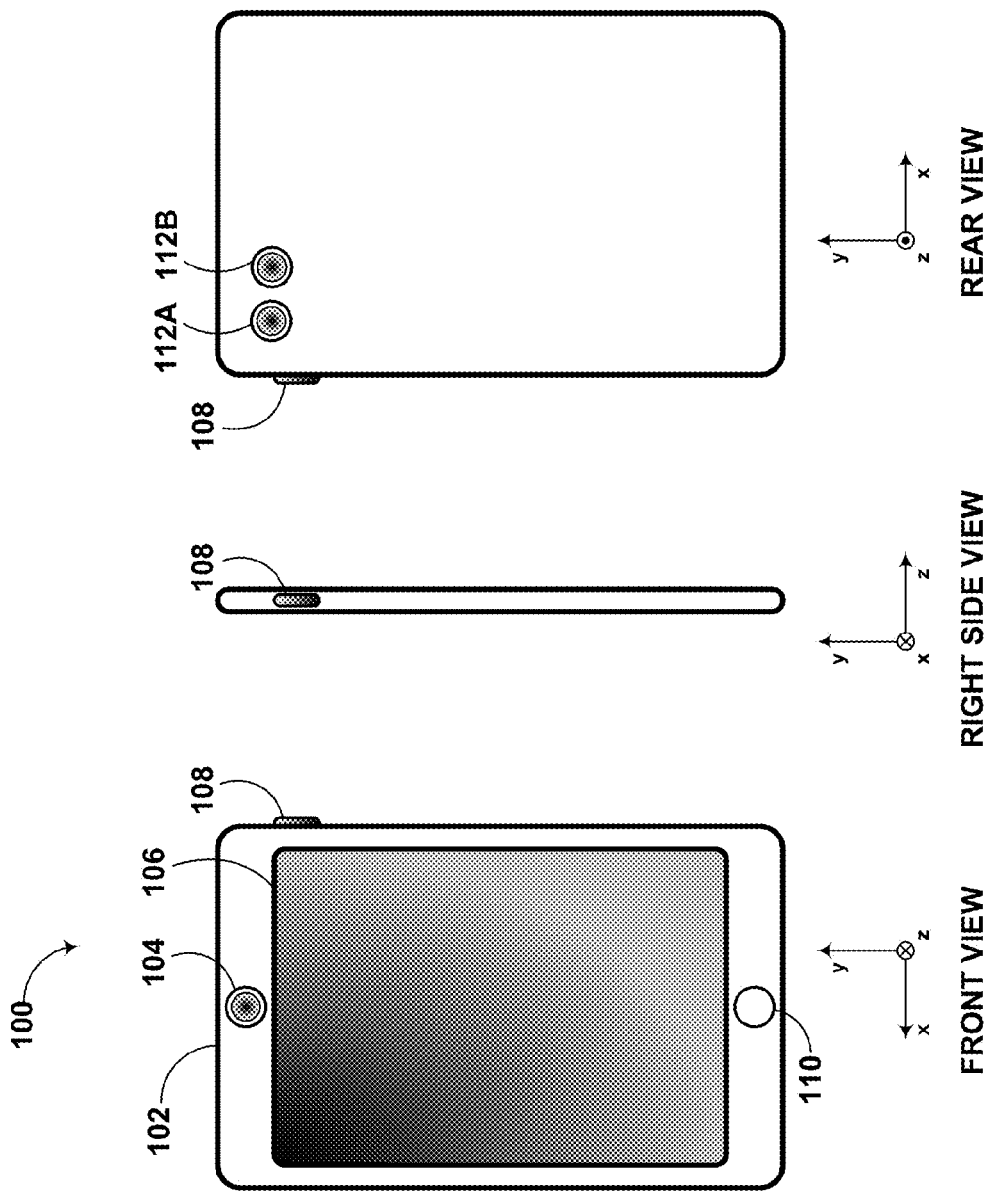
FIG. 1A depicts front, right side, and rear views of a digital camera device, in accordance with an example embodiment.

Some digital cameras, such as high-end DSLR cameras, include separate specialized components that provide automated functionality such as auto-focus, auto-exposure, and automatic white balance. These components can adjust, e.g., the focus and/or exposure, without noticeable effects to the image data (e.g., video) being captured by the camera's sensor. For example, many SLR cameras utilize through-the-lens optical AF sensors for auto focus, as well as a separate sensor array for light metering.

Other digital camera systems, such as the less-expensive cameras that are often used in mobile phones and tablets, do not include separate components for such automated functions. Accordingly, such camera systems may iteratively adjust settings and analyze resulting image data to perform auto-focusing and other such automated functions. This type of automated function may generally be referred to as an "experiment-and-adjust" function. As an example, in a mobile-phone camera, auto-focus may involve the camera repeatedly adjusting the focal settings, capturing image data, and analyzing the captured image data, until the desired subject is determined to be in focus. This particular type of iterative experiment-and-adjust function may be referred to as "focus hunting."

When a user moves a mobile-phone camera while recording a video, the distance(s) to the subject(s) in the camera's field of view may change, and focus hunting may occur. While focus hunting may be performed fairly quickly, the segments of the video that is recorded during focus-hunting may be noticeably out of focus. Accordingly, example embodiments may help to provide auto-focus and/or other automated adjustment functions that can be used in mobile phones and other such applications without the drawbacks of focus hunting.

In particular, an example device may include two or more camera systems that are oriented in the same direction. Configured as such, one or more of the camera systems may perform one or more automated experiment-and-adjust processes to determine one or more image-capture settings for another camera system is being used to capture image data. This may prevent some of the undesirable effects that may result when a device is simultaneously using the same image sensor for image capture and an automated experiment-and-adjust function. Further, using a separate camera system for an experiment-and-adjust process may improve the results of such process, as the experiments are not constrained by the need to capture image data with the same image sensor.

For example, consider the case of mobile phones that includes two camera systems, which are becoming more common for purposes of stereoscopic imaging. If the mobile phone does not use both cameras for stereoscopic imaging, then the mobile phone may record video with the first camera, while simultaneously using the second camera for auto-focusing. As such, the focal settings of the first camera may be adjusted mid-recording based on the results of the auto-focus process being carried out with the second camera. Further, since there is no concern as to the effect of focus hunting on the resulting video, the second camera system may test a wider range of settings and/or test a greater number of settings, than otherwise might be tested. These expanded testing capabilities may improve the results that are achieved by the auto-focus process.

Herein, a "camera system" may take the form of a camera, a system within a camera, a separate system that is communicatively coupled to a camera, or a combination of a camera and one or more other systems. Further, for sake of simplicity, examples described herein may attribute certain functions and/or characteristics to a "camera" or "camera device." It should be understood that, in many cases, functions and/or characteristics that are attributed to a camera or camera device may likewise be attributed to a camera system, even when this is not stated explicitly.

II. Illustrative Systems

The physical components of an image capture device may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

A. Devices with Multiple Image-Capture Systems

As noted previously, digital cameras may be standalone devices or integrated with other devices. As an example, FIG. 1A illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include two rear-facing cameras 112A and 112B. Front-facing camera 104 may be positioned on a side of body 102 typically facing a user while in operation, or on the same side as multi-element display 106. Rear-facing cameras 112A and 112B may be positioned on a side of body 102 opposite front-facing camera 104. Referring to the cameras as front and rear facing is arbitrary, and digital camera device 100 may include multiple cameras positioned on various sides of body 102.

The lenses of rear-facing cameras 112A and 112B are arranged on the upper corner on the back of digital camera device 100, and are oriented in substantially the same direction. It should be understood, however, that other multi-camera arrangements are possible. In particular, the lenses of two or more cameras, which are all oriented in substantially the same direction, may be arranged in different formations on a surface of the phone. For instance, several other multi-camera arrangements are described herein with respect to FIGS. 1B to 1D.

Figure 1C:
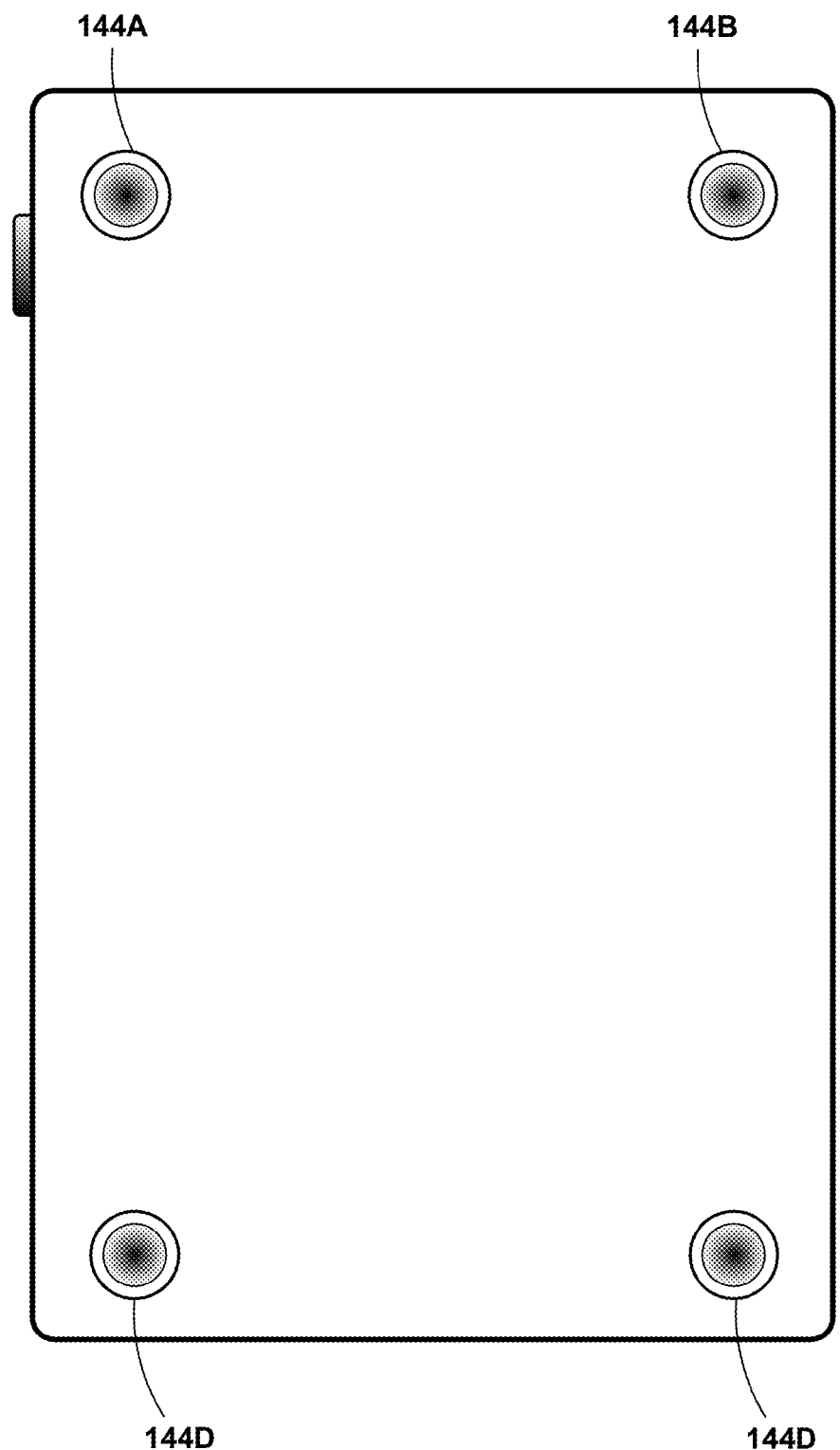
FIG. 1C shows another digital camera device with an arrangement of four cameras oriented in the same direction, in accordance with an example embodiment.

In particular, FIG. 1B shows a mobile device 120 with an arrangement of four cameras 122A to 122D oriented in the same direction, including two cameras 122A and 122B in the upper corner of the mobile device (similar to FIG. 1A), and two additional cameras 122C and 122D that are located at the lower corners of the mobile device 120. Further, FIG. 1C shows another arrangement with four cameras oriented in the same direction. In particular, the arrangement in FIG. 1C includes one camera 144A to 144D in each corner of the device 140.

Yet further, FIG. 1D shows an arrangement with six cameras 166A to 166F facing in the same direction. In FIG. 1D, the six cameras 166A to 166F are placed on the back of the mobile device 160 in less-structured, "organic," arrangement. Note that an arrangement with three or more cameras may provide multiple baselines between different pairs of cameras. For instance, a six-camera arrangement such as that shown in FIG. 1D may provide up to 15 different baselines for, e.g., stereoscopic imaging. More generally, an arrangement of n cameras that are oriented in substantially the same direction may provide up to C(n, k) baselines.

Further, it is contemplated that a multi-camera arrangement may include more than two cameras. In addition, the lenses in a multi-camera arrangement may be oriented at a different angle with respect to the surface on which the lenses are arranged. Yet further, it should be understood that multi-camera arrangements may be implemented on other sides of a digital camera device. Other variations on the multi-camera arrangements shown in the figures are also possible.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or one or both of rear-facing cameras 112A and 112B, or an image that could be captured or was recently captured by any one of or any combination of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing cameras 112A and 112B may be similarly or differently arranged. Additionally, front-facing camera 104, rear-facing cameras 112A and 112B, or any combination of these cameras, may in fact be an array of one or more cameras (or an array of lenses that direct light onto a common image sensor).

Any one or any combination of front facing camera 104 and rear-facing cameras 112A and 112B may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Any one or any combination of front facing camera 104 and rear-facing cameras 112A and 112B may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine an exposure setting of an associated camera, or to help in this determination.

Digital camera device 100 could be configured to use multi-element display 106 and either front-facing camera 104 or one or both of rear-facing cameras 112A and 112B to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

B. Illustrative Device Components

Figure 2:
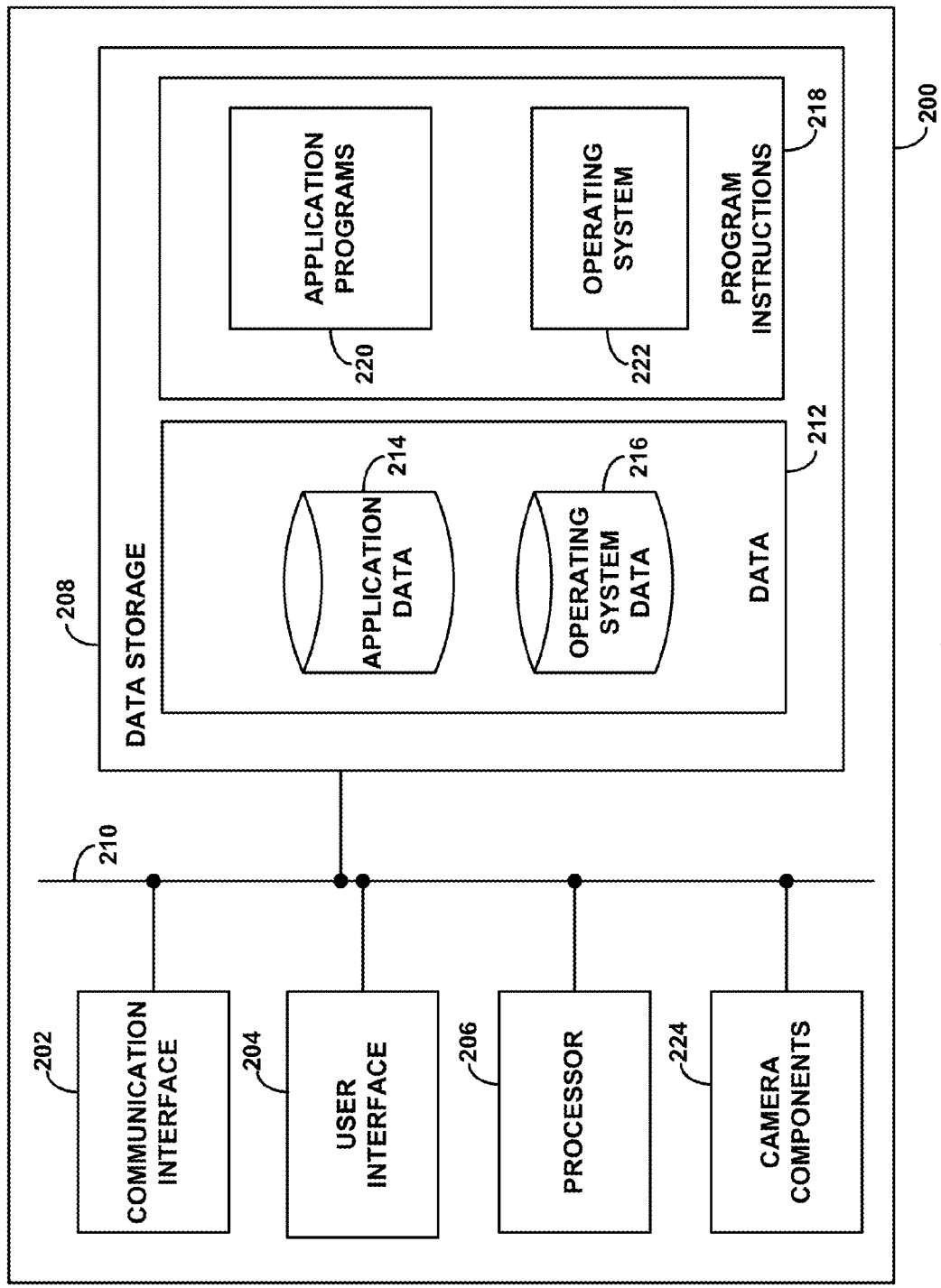
FIG. 2 is a simplified block diagram showing some of the components of an example computing device.

As noted above, the functions of digital camera device 100—or another type of digital camera—may be integrated into or take the form of a computing device, such as a mobile phone, tablet computer, laptop computer and so on. For purposes of example, FIG. 2 is a simplified block diagram showing some of the components of an example computing device 200 that may include camera components 224. Camera components 224 may include multiple cameras, such as cameras 112A and 112B.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206. Further, camera components 224 may include multiple camera systems, which each include an aperture, shutter, recording surface lens, image sensor, processor, and/or shutter button. When multiple camera systems are included, there may be some components that are shared between the systems, and other components that are not shared. For example, each camera could include its own aperture, lens, and image sensor, while sharing other components such as a processor and a shutter button. As another example, each camera could include its own lens, but share the same image sensor. Alternatively, each camera system's components may be utilized only for that camera system, and not shared with other camera systems.

C. Digital Images

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured. Note that example embodiments may utilize cameras with electronic shutters and/or mechanical shutters.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the exposure with which the image was captured.

D. Auto-Exposure

The exposure of a captured image may be determined by a combination of the size of the aperture, the brightness of the light entering the aperture, and/or the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface. In some embodiments, "true exposure time" may refer to the length of time of an exposure before any gain is applied.

Cameras—even analog cameras—may include software to control one or more camera functions and/or settings, such as aperture size, TET, gain, and so on. Additionally, some cameras may include software that can digitally process an image while or after capturing the image. While it should be understood that the description above refers to cameras in general, it may be particularly relevant to digital cameras.

A short TET may result in a reasonably accurate representation of the bright regions of a scene, but in some cases may underexpose the dark regions. Conversely, a long TET may result in a reasonably accurate representation of the dark regions, but in some cases may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

Camera devices may support an auto-exposure (AE) mode in which, prior to output image capture, the camera determines the TET based on the brightness of the scene. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128).

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

Herein, a pixel may be considered to be "properly-exposed" if its brightness value is within a predefined range. For 8-bit brightness values, this range might be, for instance, 32-224, 16-240, 96-240, 128-240, and so on. A pixel is "improperly-exposed" if its brightness value falls outside of this range (i.e., the pixel is either under-exposed or over-exposed). However, brightness values may be encoded using more or fewer bits, and the pre-defined range may be different than the example ranges given above.

AE algorithms may differ from the description above. For instance, some may be more complex, treating different colors differently, considering the spatial and/or structural components of a scene, and/or measuring contrast between regions. It is possible, however, that embodiments described herein may utilize or operate in conjunction with any AE algorithm now known or developed in the future.

High dynamic range (HDR) imaging has been proposed as a way of compensating for the deficiencies of LDR imaging. In a possible implementation, HDR imaging may involve a camera capturing multiple images of a scene at various TETs, and then digitally processing these captured images to make a single image that contains a reasonable representation of the details in most or all regions of the scene, including those that are very bright and very dark. However, determining TETs for capturing images can be problematic. In particular, difficulty in adjusting TETs for a particular scene has created limitations in HDR imaging. The methods and implementations described herein may provide computational efficiency, robustness to artifacts, and/or enhanced image quality.

In the following, the term "LDR image" may refer to an image captured using LDR imaging, and the term "LDR scene" may refer to a scene that has been determined to be reasonably represented using LDR imaging. Similarly, the term "HDR image" may refer to an image captured using HDR imaging, and the term "HDR scene" may refer to a scene that has been determined to be reasonably represented using HDR imaging. Furthermore, the term "LDR imaging" may be used interchangeably with the term "LDR image acquisition," and the term "HDR imaging" may be used interchangeably with the term "HDR image acquisition."

Figure 3:
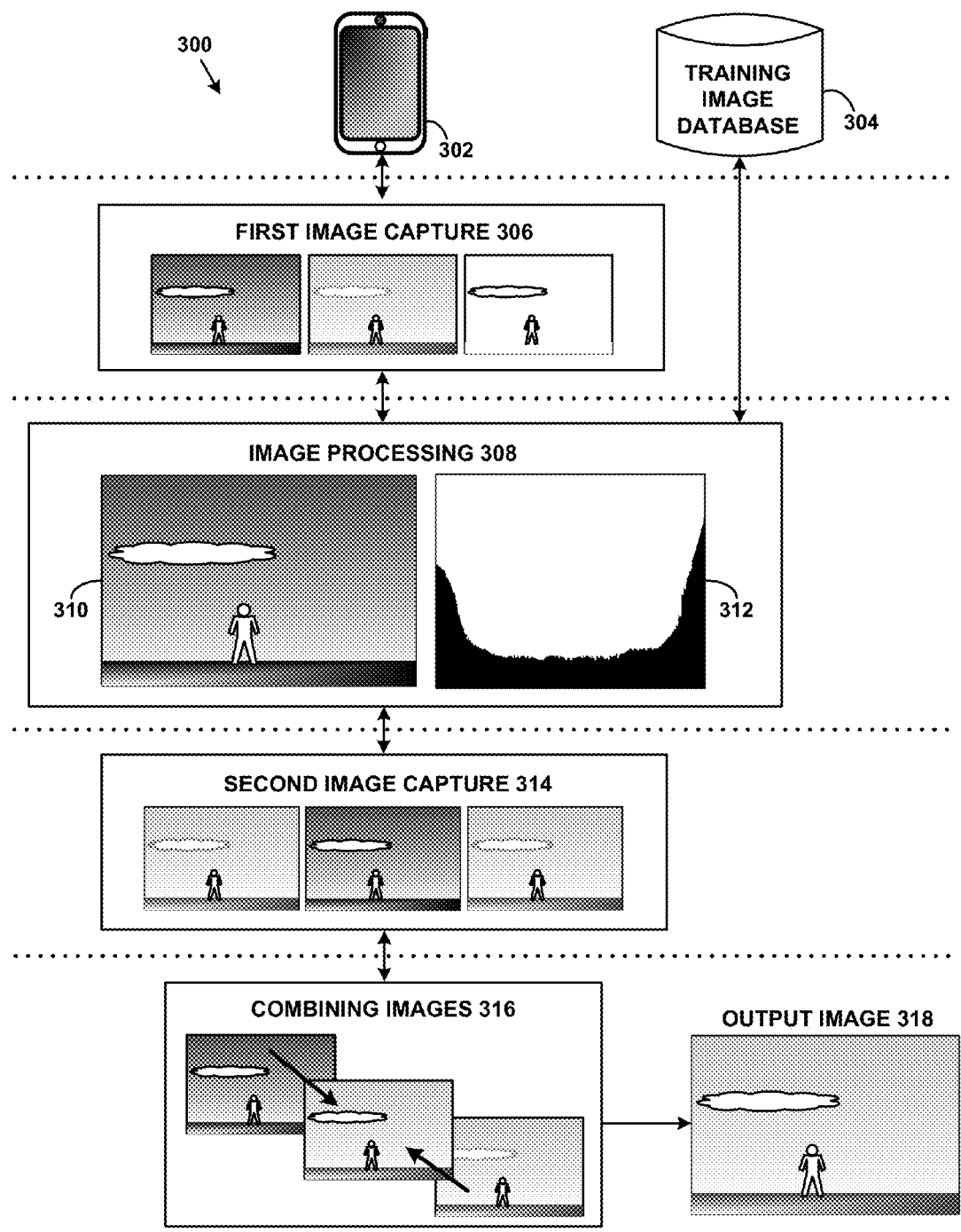
FIG. 3 depicts a flow chart, in accordance with an example embodiment.

FIG. 3 depicts a flow chart, in accordance with an example embodiment. At a high level, flow chart 300 represents an imaging pipeline for a digital camera device 302. For instance, flow chart 300 may represent a number of steps performed by digital camera device 302 to determine whether to use LDR or HDR image acquisition for a particular scene, determine one or more TETs with which to capture images of the scene, and whether and/or how to combine the captured images into an output image that is a reasonably satisfactory representation of the scene. In this way, digital camera device 302 can dynamically adapt to the lighting pattern of the scene, whether that pattern is dark, bright, or some combination of both. Digital camera device 302 may have the same or similar capabilities as digital camera device 100 in FIGS. 1A to 1D.

Flow chart 300 may represent a series of steps performed by digital camera device 302 when a shutter button is triggered. Alternatively or additionally, flow chart 300 may represent steps that are continuously performed when a viewfinder of digital camera device 302 is displaying a representation of a scene. Thus, in some embodiments, the features of flow chart 300 may be performed in a way that is not apparent to the user. For instance, the user may trigger the shutter once, with the intention of capturing a single image. However, digital camera device 302 may capture multiple images in each of first image capture 306 and second image capture 314, and provide an output image 318 that is a combination of one or more images captured during second image capture 314.

It should be noted that not all steps depicted in FIG. 3 need be performed by digital camera device 302. Some steps, such as image processing 308 and combining images 316, for example, could be performed by a different device. For instance, representations of one or more images captured during first image captures 306 and second image capture 314 could be transmitted from a capturing device to a remote computing device. The remote computing device could then perform image processing 308 and combining images 316, possibly transmitting some or all of the results thereof to the capturing device.

Additionally, training image database 304 may be included in digital camera device 302 or alternatively, training image database 304 may be part of a separate device or system that may be accessed by digital camera device 302. In some embodiments, training image database 304 may include representations of training images that can be used to help determine the structure of a payload burst used in second image capture 314.

In first image capture 306, a first group of images of a scene may be captured using a "metering burst sweep." In a metering burst sweep, each image in the group may be captured with a different TET. In some instances, the metering burst sweep may capture consecutive images across a range of TETs (e.g., 1-300 milliseconds, 0.1-500 milliseconds, or some other range). Using such ranges of TETs, the metering burst sweep may capture a series of images with TETs designed to cover this range according to a linear, logarithmic, and/or exponential distribution of TETs, among other possibilities.

In some implementations, a second camera of a device may perform metering burst sweeps to determine a TET that should be used for each frame of video that is being recorded by a first camera. Alternatively, the second camera may perform a metering burst sweep periodically during a video recording by a first camera, in order to periodically adjust the TET of the first camera. For example, a metering burst sweep could be performed by the second camera once for every ten frames of a video recording by a first camera. Other examples are also possible.

As another example, FIG. 3 depicts first image capture 306 including three digital images of a scene, each captured with a different TET. The three images exhibit diverse levels of brightness due to the different TETs used to capture the images. In other examples, more or fewer images may be captured during first image capture 306. These captured images may provide parameters for digital camera device 302 to use when capturing subsequent images of the scene.

The metering burst sweep can be used to determine the characteristics of the scene so that a subsequent payload burst structure for second image capture 314 can be selected. Therefore, in step 308, the images captured at step 306 may be processed. Particularly, step 308 may include merging one or more of the images captured at step 306 in a combined image 310. Step 308 may also include forming a histogram 312 from the merged images, and then using the histogram, and possibly some or all of the information in training image data 304, to classify the scene (e.g., as an LDR scene or an HDR scene), determine the structure of the payload burst based on the classification of the scene, and determine the TETs to use when capturing images according to the payload burst. In some embodiments, the captured images, shown as a result of first image capture 306, may be downsampled prior to merging. Further, the histogram may be an LDR histogram, HDR histogram, an log HDR histogram, or some other form of histogram.

Figure 4A:
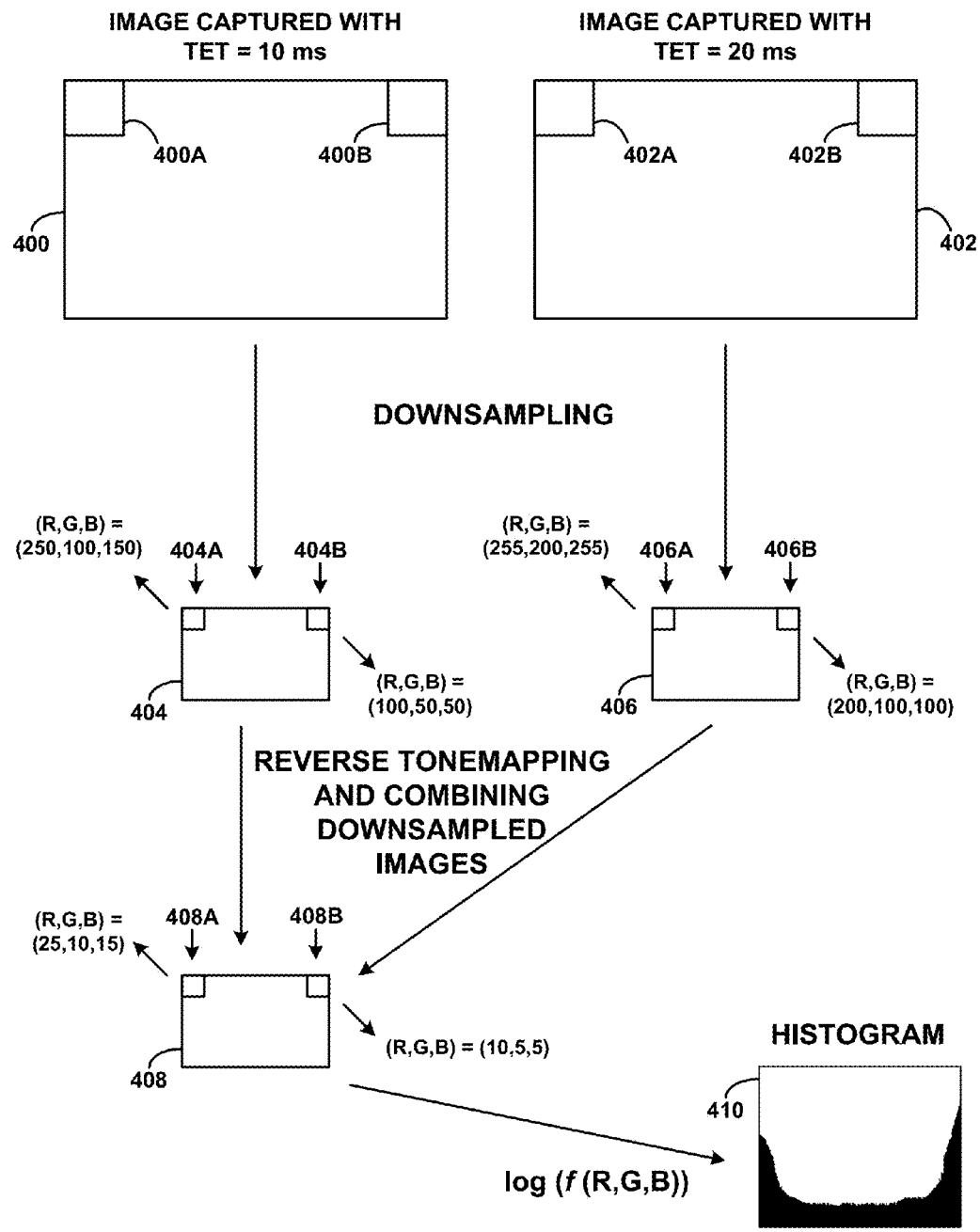
FIG. 4A depicts creating a histogram from one or more captured images, in accordance with an example embodiment.

An example of this process is illustrated in FIG. 4A. For sake of simplicity, assume that the metering burst sweep consist of two images, image 400 and image 402. In practice, anywhere from one to eight or more images may be captured in the metering burst sweep. Image 400 was captured with a TET of 10 milliseconds, while image 402 was captured with a TET of 20 milliseconds. Thus, the pixels of image 402 might be expected to be about twice as bright as those of image 400. In some cases, the pixels in each of images 400 and 402 may be tonemapped. Therefore, the tonemapping process may be reverse for these images. After the tonemapping process is reversed, the pixels of image 402 may be about twice as bright as those of image 400. Tonemapping and reverse tonemapping are discussed in more detail below. Further, note that when an image burst sweep is performed by a second camera, to determine an exposure setting or settings for a first camera that is recording video, the range of TETs used in the image burst sweep may vary by a greater amount than might otherwise be possible if the same camera is performing the sweep and capturing image data.

Images 400 and 402 may be downsampled to form images 404 and 406 respectively. Downsampling can be implemented by, for example, dividing a given image into i×j pixel blocks (i and j may take on the same value or different values), and replacing each of these blocks by a single pixel. The value of this replacement pixel can be based on the values of the pixels in the respective i×j pixel block. For instance, the value of the replacement pixel may be determined by taking an average of the values of the pixels in the block, resulting in a "fuzzier," lower-resolution, and smaller downsampled image. Thus, as one possible example, if a 1600×1200 pixel image is divided into 2×2 pixel blocks and downsampled one level, the result is an 800×600 pixel image. If the 1600×1200 pixel image is downsampled two levels (or if the 800×600 pixel image is downsampled one more level), the result is a 400×300 pixel image, and so on. Nonetheless, a tile can be downsampled in other ways. For example, a 4×4, an 8×8 pixel block or a 16×16 pixel block can be replaced by a single pixel, and more than just one or two levels of downsampling can be performed.

In some embodiments, multiple levels of downsampling may be performed for each image, thus creating a "pyramid" of downsampled images. By using images with multiple levels of downsampling, information regarding both the distribution of light levels in the image and the spatial structure of these light levels may be preserved.

Thus, for instance, FIG. 4A depicts image 400 having pixel block 400A in its top, left corner and pixel block 400B in its top right corner. Additionally, image 402 has pixel block 402A in its top, left corner and pixel block 402B in its top right corner. Each pixel block in each image is downsampled to an individual respective pixel in images 404 and 406—pixel 404A represents a downsampling of pixel block 400A, pixel 404B represents a downsampling of pixel block 400B, pixel 406A represents a downsampling of pixel block 402A, and pixel 406B represents a downsampling of pixel block 402B.

In some cases, an i×j pixel block and its associated downsampled pixel may both be referred to as a "paxel." Thus, pixel block 402A and pixel 404A may both be referred to as a paxel.

For each location in the downsampled images (e.g., pixels 404A and 406A would be considered to be in the same location), the pixel with the highest value less than 255 may be selected. In some embodiments, the pixel value of each color channel in the pixel may be compared to 255. If all of these pixel values are below 255, then the pixel is a candidate for selection. Out of all of the candidate pixels, the one with the highest pixel value may be selected. In other embodiments, a threshold different from 255 (e.g., 250, 245, or a value higher than 255) may be used instead.

FIG. 4A illustrates an example of this process. In downsampled image 404, pixel 404A may have red, green, and blue (R, G, B) values of 250, 100, and 150, respectively. In downsampled image 406, pixel 406A may have (R, G, B) values of 255, 200, and 255, respectively. Since the (R, G, B) values of pixel 404A are all less than 255 but some of the (R, G, B) values of pixel 406A are at 255, pixel 404A is selected. Similarly, pixel 404B may have (R, G, B) values of 100, 50, and 50, respectively, while pixel 406B may have (R, G, B) values of 200, 100, and 100, respectively. Since the (R, G, B) values of pixel 406B are all less than 255, but greater than the (R, G, B) values of pixel 404B, pixel 406B is selected. Other types of comparisons may be used also or instead of the process illustrated in FIG. 4A. For instance, the average of the (R, G, B) values of the respective pixels may be compared. Alternatively, the luma (Y) value of the pixel in the YCbCr color space may be used to test against the threshold.

Each selected pixel may be placed in its respective location in combined image 408. Thus, for instance, pixel 404A may be placed as pixel 408A, and pixel 406B may be placed as pixel 408B in combined image 408. Additionally, the pixels selected for combined image 408 may be reverse tonemapped.

Tonemapping is a set of procedures that include mapping the pixel values according to a pre-determined function. Thus, for instance, some camera devices map pixel values from a linear space (wherein an increase or decrease of k units in pixel value represents a proportional increase or decrease in brightness) to a non-linear space. Tonemapping may be automatically performed for artistic purposes, such as brightening mid-range pixel values. Regardless, in order to reverse tonemap the selected pixels back to linear space, the inverse of the tonemapping function may be applied to the respective pixel values.

Additionally, the pixel values may be divided by the respective TET with which the pixels were captured. Doing so may normalize the pixel values that were captured using the various TETs to a particular range. Thus, for pixel 408A, the (R, G, B) values may be 25, 10, 15, while for pixel 408B, the (R, G, B) values may be 10, 5, 5. On the other hand, for TETs under 1 millisecond (e.g., TETs of 0.25 milliseconds, 0.5 milliseconds, and so on) dividing by the TET may increase the pixel values in combined image 408. In some cases, this may result in these pixel values being greater than 255, and therefore combined image 408 may be an HDR representation of the scene.

Further, a histogram 410 may be created from combined image 408. While there are many ways in which the histogram can be formed, some embodiments may include evaluating a function of the color channels of each pixel. This function may be a maximum or some other function, for instance.

Moreover, the logarithm of this function's output may also be taken, and the resulting value plotted on histogram 410. The distribution of light levels in the real world is logarithmic. Thus, by using a log scale, there is a roughly uniform coverage of that range. For histograms based on linear light levels, more histogram bins might be used. Further, in some embodiments, a weight may be applied to the logarithm of the function's output before placing this output in histogram 410. For instance, a center-weighted average technique may be used to apply a higher weight for pixels that are closer to the center of the captured image, and a lower weight might for pixels that are further from the center of the image.

Regardless, histogram 410 may represent the distribution of pixel values in combined image 408. The vertical axis of the histogram may indicate the number of pixels of each pixel value and the horizontal axis may represent the range of pixel values. The pixel values may be within the range 0-255, or some other range may be used. For instance, an HDR histogram may include pixel values above 255. In some embodiments, an HDR histogram may represent 15-bit pixel values, i.e., from 0 to 32,767. Thus, the log values appearing in the HDR histogram may be in the range of 0 to log(32,767)=4.52.

As an example, histogram 410 plots most of the pixels on the extreme ends of its horizontal axis. This indicated that most of histogram 410 plots image 408 is a shade of black or white. However, since histogram 410 also plots data points in the middle of the horizontal axis, combined image may contain pixels with mid-range brightness as well.

Figure 4B:
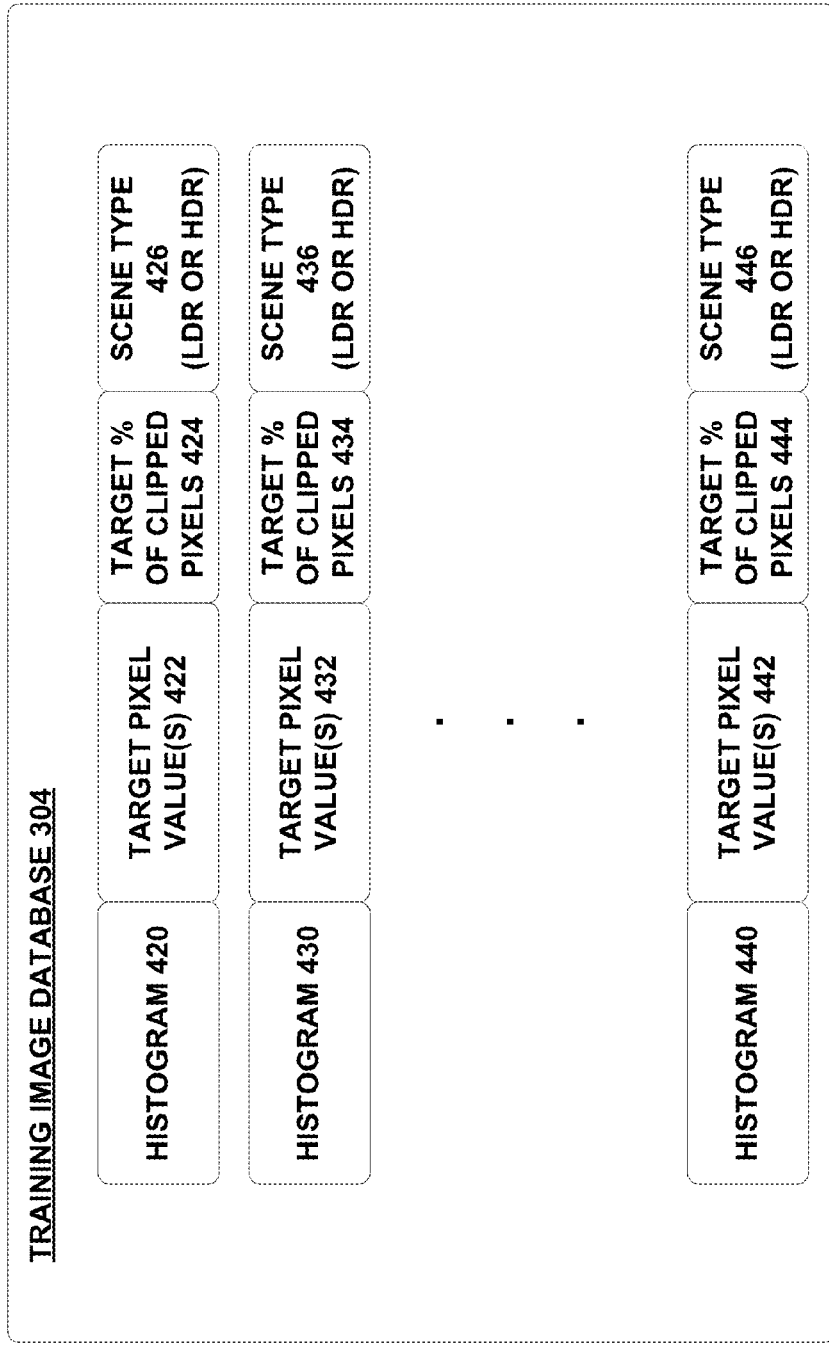
FIG. 4B depicts a training image database, in accordance with an example embodiment.

Still as part of image processing 308, histogram 410 may be compared to one or more histograms of images in training image database 304. As depicted in FIG. 4B, training image database 304 may contain a set of histograms of reference scenes, and/or associated parameters. The histograms of the reference scenes may be HDR histograms, as described above.

FIG. 4B shows training image database 304 containing an entry for histogram 420, target pixel value(s) 422, target percentage of clipped pixels 424, and scene type 426. Histogram 420 may have been derived from one or more images in the same or a similar fashion as described in the context of FIG. 4A, above. Thus, one or more images of a reference scene may be captured using various TETs, and these images may be downsampled and combined into a single image from which histogram 420 is derived. In general, the reference scene from which histogram 420 is derived need not be the same scene from which histogram 410 is derived.

In some embodiments, the percentage of pixels clipped (e.g., pixels having a pixel value of 255 or higher) in the downsampled, combined single image may be stored in target percentage of clipped pixels 424. Clipping may occur when the TET used to capture the image was either too high or too low, and some very dark or very bright details of the scene were lost in the image capture process. In some cases, only pixels clipped at one end of the range may be included in the percentage of pixels clipped. For instance, the percentage of pixels clipped may include only pixels with a pixel value of 255 or higher, and the average pixel value of unclipped pixels may be calculated over all other pixels (e.g., all pixels with a pixel value of 0-254).

Further, an indication of whether the scene was LDR or HDR may be stored in scene type 426. In some implementations, scene type 426 may take on a value of zero when the scene type is LDR, and a value of one when the scene type is HDR. Alternatively, scene type 426 may be within a range, e.g., from 0 to 1. In this case, a value less than a threshold (e.g., 0.5) might indicate an LDR scene type, and any number greater than or equal to the threshold value might indicate an HDR scene type.

Target pixel value(s) 422 may be one or more pixel values that have been determined to be desirable for the associated scene. If the scene is LDR, target pixel value(s) 422 may include a single pixel value, or a range of pixel value(s). This single pixel value (or range) may have been selected so that images of the scene with an average pixel value matching the target pixel value would be reasonably well-exposed. Thus, the target pixel value(s) 422 may be a target average pixel value. Additionally, the target pixel value(s) 422 may be LDR values (e.g., from 0 to 255).

Further, in an embodiment where a second camera performing a method such as method 4A to adjust the TET for a video being recorded by a first camera, target pixel value(s) 422 may include a single pixel value for use by the first camera. In particular, a second camera may repeat a method such as that described herein to determine a single pixel value for each frame of video that is being captured by a first camera. Alternatively, the second camera could be used to periodically determine a single pixel value for use by a first camera that is capturing video (e.g., once every four frames).

If the scene is HDR, target pixel value(s) 422 may include a short exposure target pixel value (or range), a long exposure target pixel value (or range), and possibly a fallback exposure target pixel value (or range). These pixel values or ranges may have been selected so that HDR images with the short exposure target pixel value for the short exposures and long exposure target pixel value for the long exposures may be reasonably well exposed. The fallback target pixel value may be used if HDR imaging fails (e.g., as discussed below) and a single TET is used to capture the HDR scene.

In some cases, target pixel value(s) 422, target percentage of clipped pixels 424, and scene type 426 may be determined manually by examining several synthetic exposures of the captured images and selecting the pixel value(s) and/or range(s) that appear most pleasing to the eye. Alternatively, target pixel value(s) 422, target percentage of clipped pixels 424, and scene type 426 may be determined algorithmically or automatically.

Further, in an embodiment where a second camera performing a method such as method 4A to adjust the TET for a video being recorded by a first camera, target pixel value(s) 422 may include a short exposure target pixel value (or range) for use by the first camera. In particular, a second camera may repeat such a method, using neighboring frames of video, in order to determine the short exposure target pixel value (or range) for each frame of video that is being captured by a first camera. This may help to provide noise reduction and HDR in a video. Alternatively, the second camera could be used to simply determine a single-exposure TET (e.g., a single pixel value) for each frame of video being captured by a first camera.

Training image database 304 may also contain similar entries for histogram 430, target pixel value(s) 432, target percentage of clipped pixels 434, and scene type 436, as well as histogram 440, target pixel value(s) 442, target percentage of clipped pixels 444, and scene type 446. In some embodiments, one or more parameters, such as the target percentage of clipped pixels, may be omitted from training image database 304. Additionally, other parameters may be included in training image database 304. Training image database may store as few as one or several tens, hundreds, or thousands of such entries, each entry possibly relating to a different scene.

As discussed above in the context of an image captured during first image capture 306, multiple levels of downsampling may be performed for each image in training image database 304, thus creating a "pyramid" of downsampled versions of each image. By using images with multiple levels of downsampling, information regarding both the distribution of light levels in the image and the spatial structure of these light levels may be preserved. Histograms for each of these downsampled images may be included in training image data 304.

The information in training image database 304 may be stored therein during calibration, testing, and/or other pre-shipment evaluations before commercial operation, among other possibilities. Alternatively, the information may also be stored on various other devices and systems capable of managing training image database 304. Regardless, the information may be substantially static in nature, though the information may be modified through firmware and/or software updates or other installations.

By comparing histogram 410 (and or a similarly-derived histograms based on downsampled versions of images 400 and 402) with the histograms in training image data 304, the dynamic range of the scene represented in images 400 and 402 may be estimated. This estimated dynamic range may be used to determine, obtain, or otherwise select a payload burst structure for second image capture 314.

For example, each histogram 410 may be compared to each histogram stored in training image data 304. A pair of histograms can be compared in various ways, any of which may be used. In some embodiments, the earth mover's distance (EMD) between the pair of histograms may be calculated. The EMD is 0 when the histograms are identical, and increases with the differences between the histograms. Thus, a lower EMD indicates a good match between the two histograms, and a higher EMD indicates a poor match between the two histograms.

A weight may be derived from the EMD for a particular pair of histograms. For example, the weight may be inversely proportional to its associated EMD value. In some situations, the weight w may be derived as:

$$w = \frac{1}{EMD^n}$$

where EMD is the EMD value and n may be in the range of 1 to 10. However, other values of n may be used. Thus, in some embodiments, the weight may take on a value between 0 and 1. In the case that EMD is 0, and appropriately large weight (e.g., 1) may be chosen. Alternatively, a very small value (e.g., 0.001) may be added to the denominator to avoid dividing by 0. Regardless, a good match between the two histograms may result in a high weight, and a poor match between the two histograms may result in a low weight.

For each pair of histograms (where a first histogram is histogram 410 and a second histogram is from an entry in training image database 304), the weight w may be applied to the respective scene type associated with the second histogram's entry in training image database 304. The result may be averaged over the pairs of histograms to determine an "HDR-ness" of the scene. For instance, if the resulting "HDR-ness" is at or above 0.5 on a scale of 0 to 1, then the scene may be designated for HDR processing, but if the resulting "HDR-ness" is below 0.5 on the same scale, then the scene may be designated for LDR processing.

It should be understood that the embodiment described above is just one possible way of determining the brightness and "HDR-ness" of a scene. Other techniques could be used instead, and some of these other techniques may be based on comparing the parameters (e.g., percentage of clipped pixels and average value of unclipped pixels) of the images captured during first image capture 306 with the same or similar parameters of the images represented in training image database 304. Further techniques may include comparing the respective downsampled image pyramids of the first and second histograms.

In order to determine the TETs for the payload burst, the following example procedure may be used. However, other procedures may be used instead.

For each pair of histograms (again, where the first histogram is histogram 410 and a second histogram is from an entry in training image database 304), the weight w may be applied to the respective target pixel value associated with the second histogram's entry in training image database 304. The result may be averaged to determine a target average pixel value for the scene represented by histogram 410. If the scene type is HDR, two or more target average pixel values may be determined.

For each target average pixel value, interval halving may be used to search for a particular TET value such that if the scene were to be captured with the particular TET value, the resulting image would have the target average pixel value or about the target average pixel value. One possible method for determining a particular TET value based on a target average pixel value is shown in the pseudocode below.

TABLE 1

1. lo_tet = 0.125 ms
2. hi_tet = 66.6 * 8 * 4 ms
3. for (int i = 1; i < t; i++) {
4.     mid_tet = (lo_tet + hi_tet) / 2
5.     pixel_value_at_mid_tet = <synthetically expose the HDR Image at 'mid_tet', tonemap it, and extract the average pixel value of the resulting LDR image.>
6.     if (pixel_value_at_mid_tet > target_average_pixel value)
    {
7.         hi_tet = mid_tet
8.     } else {

TABLE 1-continued

```
9.          lo_tet = mid_tet
10.         }
11.     }
```

At lines 1 and 2 of Table 1, initial low and high TET values (lo_tet and hi_tet, respectively) are defined. These values may be chosen at or near the extreme ends of the range in which the ultimate TET value (mid_tet) is expected to fall. In some embodiments, a broader range or a narrower range may be used.

Lines 3-11 depict a loop that may be iterated t times. The value of t may be selected so that mid_tet converges after t iterations of the loop. In some embodiments t may be as low as 2 or 3, but in other embodiments, t may be 5, 10, 20, 50, 100, or some other value. Nonetheless, at line 4, mid_tet is set to be the average (midpoint) of lo_tet and hi_tet.

At line 5, the pixel value of the image at mid_tet is determined. One possible way of making this determination is to synthetically expose the HDR image as if the image were captured using a TET of mid_tet. The resulting image (which may be an HDR image) may be tonemapped, and the average pixel value of the tonemapped image (pixel_value_at_mid_tet, which may be an LDR value) may be determined.

Synthetic exposure is one way of obtaining an LDR image from an HDR image. Suppose that an HDR image was captured using a TET of T. This HDR image can be synthetically exposed to a TET of p times T by multiplying the pixel values of each pixel in the HDR image by p (p may be greater than or less than one). In the resulting image, all pixel values above 255 are "clipped" to 255. This process simulates the appearance of the scene as if it were captured using a TET of p times T with LDR imaging. Alternatively, a non-log HDR histogram of an HDR image (with or without center-weighted averaging applied) may be used. After this step, whatever processing would normally be applied to the linear image (such as tonemapping) may be emulated, in order to produce a synthetic LDR image. The average value in that image (applying center-weighted averaging if desired) may be taken and compared to the target pixel value.

At lines 6-11, if this resulting average pixel value is greater than the target average pixel value, then mid_tet is too high, and hi_tet is set to be mid_tet in order to reduce mid_tet in the next iteration. On the other hand, if the resulting average pixel value is less than or equal to the target average pixel value, then the mid_tet is too low, and lo_tet is set to be mid_tet in order to increase mid_tet in the next iteration.

The process illustrated by Table 1 may be repeated for each TET value that may be used in the payload burst structure. Thus, if the scene is determined to be an LDR scene, the process of Table 1 may be carried out for one TET. However, if the scene is determined to be an HDR scene, the process of Table 1 may be carried out for two or more TETs (e.g., the short TET, the long TET, and/or the fallback TET), all three of which may have different target average LDR pixel values.

In step 314, the second group of images may be captured. The number of images captured and the arrangement of TETs used to capture these images may be referred to as a "payload burst." For example, in FIG. 3 second image capture 314 includes three images of a scene, each captured with a TET identified in step 308. It should be understood that the TETs identified in step 308 may be the same or different than the TETs used to capture images in step 306. Additionally, it is possible that all three images in second image capture 314 are captured with the same or similar TETs.

In step 316, images from the second group of images may be combined. Combining images may include aligning two or more of the images. In some instances, images may be aligned globally (i.e., aligning whole images as opposed to portions of images), locally (i.e., aligning portions of images), or possibly both globally and locally. Further, combining two or more images may also include merging them to form an output image 318. This merging may be carried out in accordance with any image fusion technique now known or developed in the future.

Merging the images in the second group of images may result in output image 318 being sharper and/or better-exposed than any of the individual images in the second group. For instance, if some of the images in second image capture 314 are captured with the same or similar TETs, these images may be merged to reduce noise in one or more sections of the images. Alternatively or additionally, if the images in second image capture 314 are captured with two or more different TETs, at least some images with different exposure times may be merged according to HDR procedures. Regardless, the output image may be stored on a computer-readable medium and/or displayed on an output medium such as the multi-element display 106 of FIG. 1A.

In some embodiments, the arrangements of various possible payload burst structures may be determined based on the TETs determined in step 308, as well as an understanding of combining images step 316. While numerous arrangements of payload burst structures may be possible, three examples are described herein.

TABLE 2

| Scene Type | Payload Burst Structure |
|---|---|
| LDR | T T T T |
| HDR | L S L L S L L S L L |
| HDR (with fallback) | L S L L S L L F F F |

Table 2 illustrates these examples. In the first example, the scene type is LDR. In this example, the payload burst structure includes four images captured sequentially, and may be referred to as an "LDR burst structure." Each "T" in the Payload Burst Structure column of Table 2 may represent a captured image. Each of these images may be captured using the same or a similar TET that was determined in step 308. In some embodiments, fewer or more images may be captured in an LDR payload burst. For example, as few as one, or as many as ten or more images may be included.

Regardless of the number of images captured, some of these images may be aligned and combined in step 316. For instance, if m images are captured in the payload burst, the sharpest one of these images may be selected as a "primary image," and the remaining m−1 images may be considered "secondary images." In some implementations, the sharpness of an image may be measured by the image's resolution and/or boundaries between zones of different tones and/or colors in the image. Alternatively or additionally, other sharpness measurements may be used.

Further, zero or more of the m−1 secondary images may then be aligned and merged with the sharpest image. For instance, alignment may be attempted between each of the secondary images and the sharpest image, respectively. If the alignment fails for parts of a respective secondary image, those parts may be discarded, and not combined with the primary image. In this way, the sharpest image may be denoised with information from some or all of the secondary images.

In the second example, the scene type is HDR. In this example, the payload burst structure includes ten images captured according to a pattern of long and short TETs, and may be referred to as an "HDR burst structure." In the Payload Burst Structure column of Table 2, each "L" may represent an image captured with the long TET, each "S" may represent an image captured with the short TET. Thus, the pattern of "L S L L S L L S L L" may indicate that the first image of the payload burst is captured using the long TET, the second image is captured using the short TET, the third and fourth images are captured using the long TET, the fifth image is captured using the short TET, the sixth and seventh images are captured using the long TET, the eighth image is captured using the short TET, the ninth image is captured using the long TET, and the tenth image is captured using the long TET.

The long and short TETs may be determined based on the results of image processing 308. Thus, the long and short TETs may be selected so that the resulting images captured with these TETs can be combined using HDR procedures. The long TET may be used to capture the details in dark sections of the scene, while the short TET may be used to capture the details in bright sections of the scene.

Examples of short TET values may include TETs of 1 millisecond, 2 milliseconds, and/or 8 milliseconds, while examples of long TET values may include TETs of 20 milliseconds, 40 milliseconds, and/or 80 milliseconds. However, short and long TETs may take on different values.

Despite the payload burst in the second example having a particular structure in Table 1, other structures may be used. For example, payload burst structures of "L S L S L S L S L S" or "L L S L L S L L S L" could potentially provide suitable patterns of long and short TETs. Further, some payload burst structures may include medium TETs (denoted by an "M"). Thus, additional example payload bursts may include "S M L L L S M L L L" or "S M L S M L S M L L" structures.

In some embodiments, a payload burst structure may include more or fewer than ten images. Generally speaking, the determining the length of the payload burst structure involves a tradeoff. On one hand, a long payload burst (i.e., a payload burst with a large number of image captures) is desirable because the likelihood of one or more of the captured image being well-exposed and sharp is increased. On the other hand, if the payload burst is too long, the likelihood of ghosting due to movement in the scene is also increased. Additionally, darker scenes may benefit from images captured using a longer TET, so that more light can reach the recording surface. Therefore, the payload burst structure may be based, possibly in part, on these considerations.

In the third example, the scene type is also HDR. However, in this example, the associated payload burst structure (which also may be referred to as an HDR burst structure) includes seven images captured according to a pattern of long and short TETs, followed by three fallback TETs. Each "F" may represent an image captured with the fallback TET, and the fallback TET may take on a value different from both the long and short TETs.

Regardless of the type of payload burst structure, the images of an HDR scene may be aligned and combined. Images captured using the short TET may be referred to as "short images" for convenience, and images captured with the long TET may be referred to as "long images" for convenience.

In some embodiments, the sharpest short image may be selected, from the short images, as the primary short image. Zero or more of the remaining secondary short images may then be aligned and merged with the primary short image. For instance, alignment may be attempted between each of the secondary short images and the primary short image, respectively. If the alignment fails for parts of the respective secondary short image, those parts may be discarded, and not combined with the primary short image. In this way, the sharpest short image may be denoised with information from some of the secondary short images.

The same or a similar process may be undertaken for the long images. For example, the sharpest long image may be selected, from the long images, as the primary long image. Zero or more of the remaining secondary long images may then be aligned and merged with the primary long image. Alignment may be attempted between each of the secondary long images and the primary long image, respectively. If the alignment fails for parts of the respective secondary long image, those parts may be discarded, and not combined with the primary long image.

The resulting combined short image (e.g., the sharpest short image possibly denoised by information from zero or more secondary short images) and the resulting combined long image (e.g., the sharpest long image possibly denoised by information from zero or more secondary long images) may then be aligned. If the alignment succeeds, these two images (e.g., both LDR images) may be combined according to HDR procedures. For instance, they may be combined into an HDR image, and the HDR image may then be tonemapped so that its brightness falls within a range commensurate with the display abilities of convention video output devices (e.g., pixel values between 0 and 255, inclusive). The resulting tonemapped HDR image may be designated as output image 318. In some embodiments, if the signal-to-noise ratio of part of all of output image 318 is still lower than a threshold value, a de-noising procedure may be applied to further reduce noise. Additionally, output image 318 may also be sharpened, possibly after applying the de-noising procedure. In general, various types of HDR fusion algorithms, such as Exposure Fusion or Local Laplacian Filters, may be used to merge short and long images. If medium TETs are used in the payload burst structure, these HDR fusion algorithms may be applied to one or more medium images as well.

If the alignment fails between the combined short image and the combined long image, then the HDR processing fails. However, if fallback images were captured, one or more of the fallback images may be used to form output image 318. For instance, the sharpest fallback image may be selected. Zero or more of the remaining secondary fallback images may be aligned and combined with the sharpest fallback image carried out in a similar fashion as the processes described above for the short and long images. For payload burst structures without fallback images in which alignment fails, the combined long or short image may be used to form output image 318.

Figure 5:
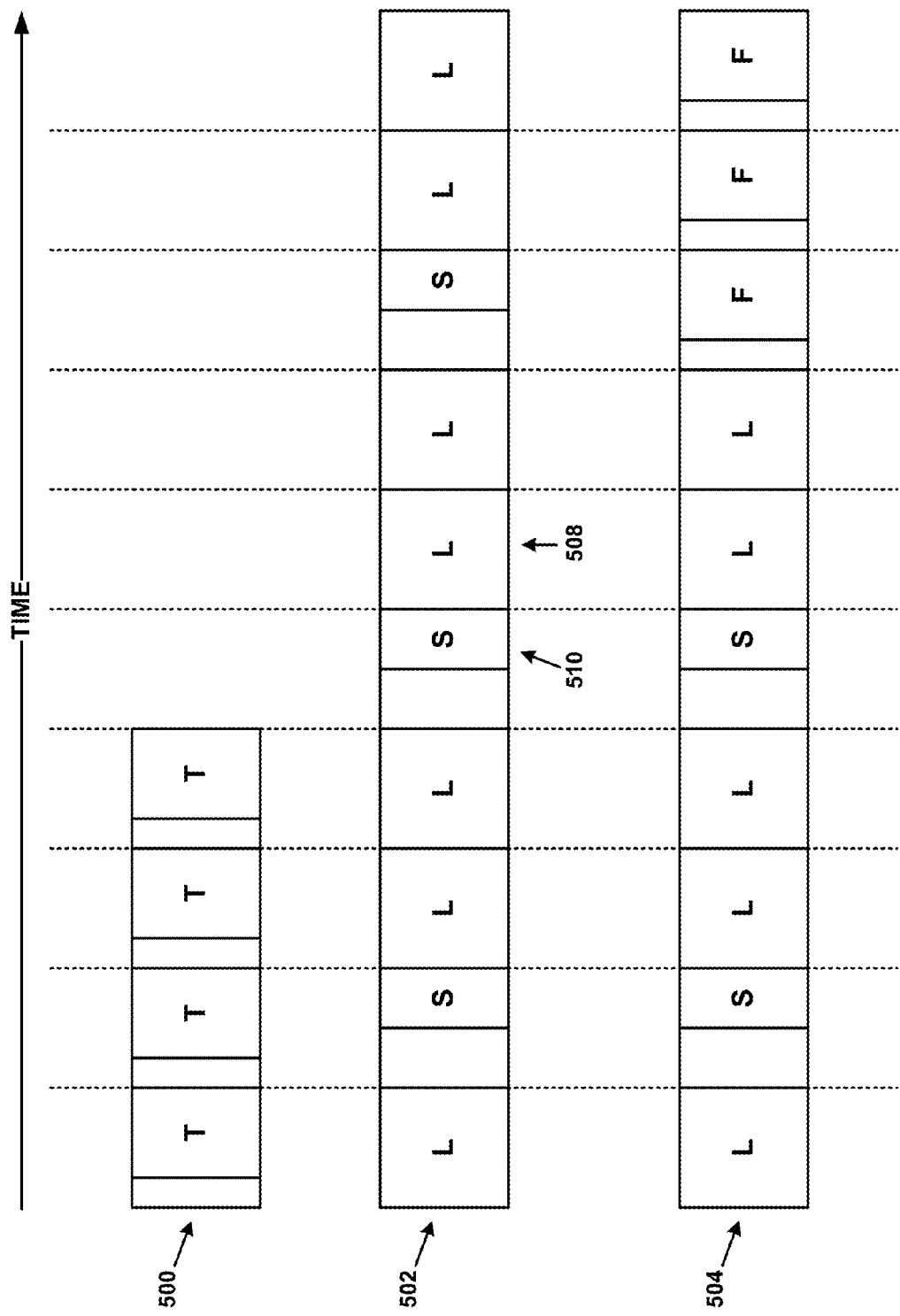
FIG. 5 depicts payload burst structures for capturing images, in accordance with an example embodiment.

Example payload burst structures are further illustrated in FIG. 5. Payload burst structure 500 may represent a payload burst for an LDR scene, payload burst structure 502 may represent a payload burst for an HDR scene, and payload burst structure 504 may represent a payload burst for an HDR scene with fallback. Each burst structure shows the approximate duration of the TET for each image capture. For example, for burst structures 502 and 504, short TETs are of a lesser duration than long TETs, and the duration of fallback TETs are between that of short and long TETs.

In FIG. 5, the vertical dotted lines depict epochs in time at which an image capture can begin. Some electronic image sensors operate at a particular frequency, such as 30 hertz. A sensor operating at this frequency can capture 30 images per second, or approximately one image every 33.33 milliseconds. Thus, the duration between the epochs in FIG. 5 may be 33.33 milliseconds. Nonetheless, for low-light scenes, the exposure time may be longer than 33.33 milliseconds, and the operating frequency of the image sensor may be adjusted downward accordingly. In this example, a TET longer than 30 milliseconds can be achieved by increasing the gain component of the TET.

For some sensors, image capture may be activated only at the end of such an epoch. Thus, as shown in FIG. 5, each image capture ends at the edge of a respective epoch. However, due to their varying TETs, some image captures may begin at different times. Alternatively, for some image sensors, image capture may be activated only at the beginning of an epoch.

It should be understood that various other techniques, procedures, and/or algorithms may be used determine a payload burst structure. Thus, the discussion above accompanying Table 2 and FIG. 5 above merely provides some possible payload burst structures. Other techniques may be used without departing from the scope of the embodiments herein.

For example, in some embodiments, the average pixel value of the tonemapped image (e.g., step 5 in Table 1) may be calculated using either an RMS or SMR method, based on the length of the TET. The RMS average of n values may be calculated as:

$$RMS = \sqrt{\frac{x_1^2 + x_2^2 + \cdots + x_n^2}{n}}$$

The SMR average of n values may be calculated as:

$$SMR = \left(\frac{\sqrt{x_1} + \sqrt{x_2} + \cdots + \sqrt{x_n}}{n}\right)^2$$

For shorter TETs, e.g., the short TETs and/or fallback TETs of an HDR payload burst, or possibly the TETs of an LDR burst, it may be desirable to attempt to increase or maximize the brightness of the pixels without clipping them. Thus, taking the RMS average of the pixel values puts more weight on the brighter pixels. For longer, TETs, e.g., the long TETs of an HDR payload burst, it may be desirable to emphasize the darker parts of the scene. Thus, taking the SMR average of the pixel values puts more weight on the darker pixels.

Another variation is illustrated in the context of burst structure 502 of FIG. 5. This variation involves selecting the sharpest short image. For sake of argument, assume that the sharpest long image is long image 508. Then, instead of selecting the sharpest short image as the primary short image, the short image that was captured closest in time to the sharpest long image may be selected as the primary short image. This could be, for instance, short image 510, which immediately precedes long image 508. Then, the remaining secondary short images may be aligned with and/or combined into (as the alignments permit) the primary short image. Alternatively, if the image sensor captures images at the beginning of the epoch, a short image following (perhaps immediately following) the sharpest long image may be selected as the primary short image. As an alternative, a temporally-adjacent short image/long image pair may be selected so that, together, these images maximize a combined-sharpness metric.

In some embodiments, the payload burst structure may be based on whether the image sensor captures images with an exposure time of less than the readout time of the images sensor's pixels (referred to herein as sub-readout exposure times) at the beginning or end of an image capture epoch. If the image sensor captures sub-readout exposure times at the end of the image capture epoch, the payload burst structure may include one or more two-TET subsequences of a short TET immediately followed by a long TET. If the image sensor captures sub-readout exposure times at the beginning of the image capture epoch, the payload burst structure may include one or more two-TET subsequences of a long TET immediately followed by a short TET.

One possible advantage of selecting the primary long image in this fashion is to reduce motion blur, or "ghosting," effects. For example, if a scene contains motion, merging multiple images captured from the scene may result in the motion appearing in the merged image as a blur. In general, the greater the difference in time between when the images are captured, the greater this blurring. By selecting primary long and short images that are close to one another in time, the ghosting may be reduced It should be noted that the steps illustrated by flow chart 300 may be carried out by various types of cameras and/or computing devices, such as those exemplified by digital camera device 302 and/or computing device 200. Further, it may be possible to distribute aspects of some individual steps between multiple cameras and/or computing devices. For example, first image capture 306 and second image capture 314 may occur on digital camera device 302. Further, image processing 308 and combining images 318 may occur on a different computing device. Other combinations of distributing individual steps may also exist.

Figure 6:
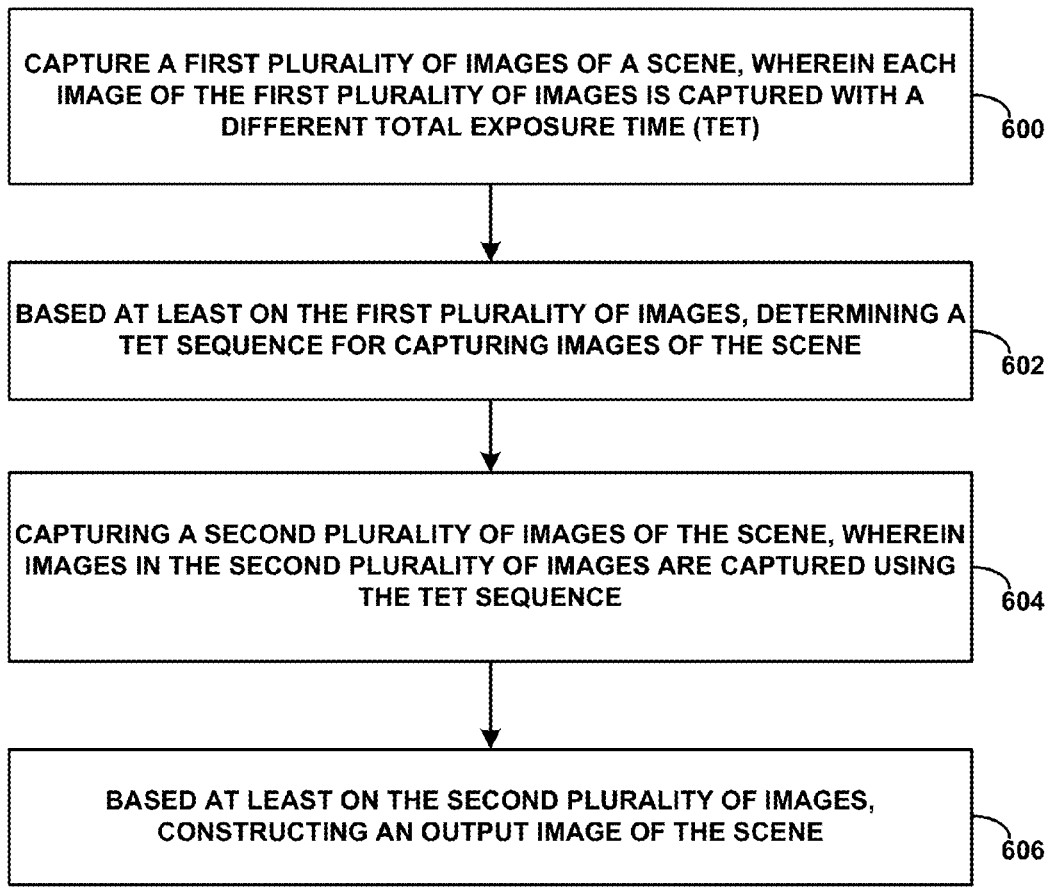
FIG. 6 depicts a flow chart, in accordance with an example embodiment.

FIG. 6 depicts a flow chart, in accordance with an example embodiment. At step 600, a first plurality of images of a scene may be captured, perhaps by an image sensor. Each image of the first plurality of images may be captured with a different total exposure time (TET).

At step 602, based at least on the first plurality of images, a TET sequence for capturing images of the scene may be determined. Determining the TET sequence may involve determining a scene histogram based on at least one of the images in the first plurality of images of the scene. The scene histogram may be based on downsampling and combining the images in the first plurality of images of the scene.

In some embodiments, additional histograms may be stored in a training image database. These histograms may be based on at least two images captured of respective scenes. The histograms may be associated with respective dynamic range parameters, where the respective dynamic range parameters indicate whether the respective scenes are LDR or HDR. Determining the TET sequence may further involve comparing the scene histogram to at least one histogram in the training image database, and based on an outcome of the comparison, determining a dynamic range parameter for the scene from the respective dynamic range parameters, where the TET sequence is further based on the dynamic range parameter for the scene.

If the dynamic range parameter for the scene indicates that the scene is LDR, then determining the TET sequence may involve selecting a single TET value to use in the TET sequence. If the dynamic range parameter for the scene indicates that the scene is HDR, then determining the TET sequence may involve selecting a short TET value and a long TET value to use in the TET sequence. If the scene is HDR, determining the TET sequence may also involve selecting a fallback TET value to use in the TET sequence.

In some embodiments, the histograms in the training database may also be associated with respective target pixel values. In these embodiments, determining the TET sequence may further involve determining one or more target pixel values for the scene based on the respective target pixel values in the training database, selecting one or more TET values to use in the TET sequence based on the one or more determined target pixel values.

At step 604, a second plurality of images of the scene may be captured by the image sensor. The images in the second plurality of images may be captured using the TET sequence. At step 606, based at least on the second plurality of images, an output image of the scene may be constructed.

Determining the TET sequence may involve determining that the scene is an LDR scene and defining a common value for TETs in the TET sequence. Constructing the output image of the scene may involve aligning and combining one or more of the images in the second plurality of images captured using the common value.

Alternatively or additionally, determining the TET sequence may involve determining that the scene is an HDR scene and defining a short TET value and a long TET value. Constructing the output image of the scene may involve aligning and combining (i) one or more of the images in the second plurality of images captured with the short TET value, and (ii) one or more of the images in the second plurality of images captured with the long TET value.

Alternatively or additionally, determining the TET sequence may involve determining that the scene is an HDR scene and defining a short TET value, a long TET value, and a fallback TET value. Constructing the output image of the scene may involve attempting to align (i) one or more of the images in the second plurality of images captured with the short TET value, with (ii) one or more of the images in the second plurality of images captured with the long TET value. Constructing the output image of the scene may further involve determining that alignment of (i) the one or more of the images in the second plurality of images captured with the short TET value, and (ii) the one or more of the images in the second plurality of images captured with the long TET value has failed. Constructing the output image of the scene may also involve, in response to determining that the alignment has failed, aligning and combining one or more of the images in the second plurality of images captured with the fallback TET value to form the output image.

Figure 7:
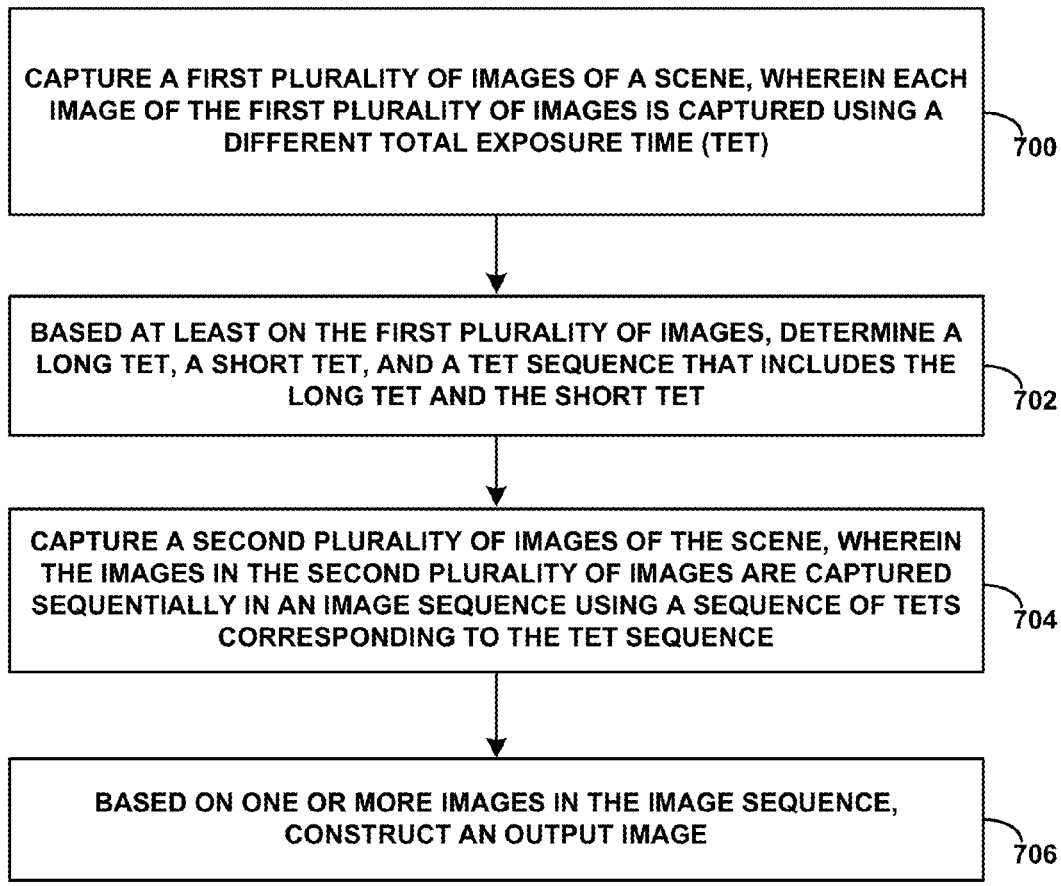
FIG. 7 depicts another flow chart, in accordance with an example embodiment.

FIG. 7 depicts another flow chart, in accordance with an example embodiment. At step 700, a first plurality of images of a scene may be captured by an image sensor. Each image of the first plurality of images may be captured using a different total exposure time (TET). At step 702, based at least on the first plurality of images, a long TET, a short TET, and a TET sequence that includes the long TET and the short TET may be determined.

At step 704, a second plurality of images of the scene may be captured by the image sensor, wherein the images in the second plurality of images are captured sequentially in an image sequence using a sequence of TETs corresponding to the TET sequence. The image sequence may include a three-image sub-sequence of a first long-TET image captured using the long TET, followed by a short-TET image captured using the short TET, followed by a second long-TET image captured using the long TET. Alternatively, the image sequence may include a three-image sub-sequence of a first long-TET image captured using the long TET, followed by a second long-TET image captured using the long TET, followed by a short-TET image captured using the short TET. The pattern in the subsequence may be chosen based on characteristics of the camera device (e.g., whether a rolling shutter is used and/or other image sensor characteristics) and/or characteristics of the scene (e.g., average pixel value or some other metric). Regardless, the sub-sequence may repeat one or more times through the payload burst structure.

At step 706, based on one or more images in the image sequence, an output image may be constructed. In some embodiments, the image sequence may include a two-image sub-sequence of a primary short-TET image followed by a primary long-TET image. The image sequence may also include one or more secondary short-TET images and one or more secondary long-TET images. The primary short-TET image and the secondary short-TET images may be captured using the short TET, and the primary long-TET image and the secondary long-TET images may be captured using the long TET. Constructing the output image may involve forming a combined short-TET image, where the combined short-TET image includes the primary short-TET image and at least part of the one or more secondary short-TET images, forming a combined long-TET image, where the combined long-TET image includes the primary long-TET image and at least part of the one or more secondary long-TET images, and forming the output image, where the output image includes at least part of the combined short-TET image and at least part of the combined long-TET image.

Alternatively or additionally, the image sequence may include a long-TET image captured using the long TET. Constructing the output image may involve determining that the long-TET image is a sharpest image of all images in the image sequence captured using the long TET. Based on the long-TET image being the sharpest image of all images in the image sequence captured using the long TET, selecting the long-TET image as a primary long-TET image, and selecting, as a primary short-TET image, an image captured using the short TET that is adjacent to the primary long-TET image in the image sequence. Constructing the output image may further involve forming a combined short-TET image, where the combined short-TET image includes the primary short-TET image and at least part of one or more images from the image sequence that were captured using the short TET, forming a combined long-TET image, where the combined long-TET image includes the primary long-TET image and at least part of one or more images from the image sequence that were captured using the long TET, and forming the output image, where the output image includes at least part of the combined short-TET image and at least part of the combined long-TET image.

In some examples, the primary short-TET image may immediately precede the primary long-TET image in the image sequence. The short-TET image that immediately precedes the primary long-TET image in the image sequence may be selected as the primary short-TET image based on image capture ending at the edge of respective image capture epochs.

In other examples, the primary short-TET image may immediately follow the primary long-TET image in the image sequence. The short-TET image that immediately follows the primary long-TET image in the image sequence may be selected as the primary short-TET image based on image capture beginning at the edge of respective image capture epochs.

The steps depicted in FIGS. 6 and 7 may be carried out by a camera device, such as digital camera device 100, a computing device, such as computing device 200, and/or by two or more distinct devices. For instance, in some embodiments, the image capture steps may be performed by an image sensor and the remaining steps may be performed by a separate computing device. Other arrangements are possible. Further, the flow charts depicted in FIGS. 6 and/or 7 may be modified according to the variations disclosed in this specification and/or the accompanying drawings.

The term "sequence" as used herein may refer to one or more TETs arranged sequentially, and/or one or more images captured sequentially. However, in some embodiments, a camera device may include multiple image sensors (e.g., an image sensor array), and these image sensors may capture images sequentially, in parallel, or using some combination of both. For sake of convenience, the terms "sequence" or "sequential" may also be used to refer to capturing at least some images of a "sequence" in parallel.

Figure 8A:
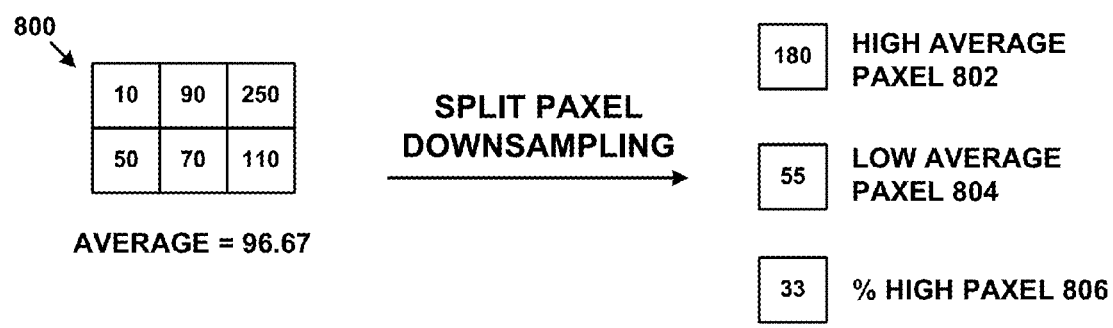
FIG. 8A depicts split paxel downsampling, in accordance with an example embodiment.
Figure 8B:
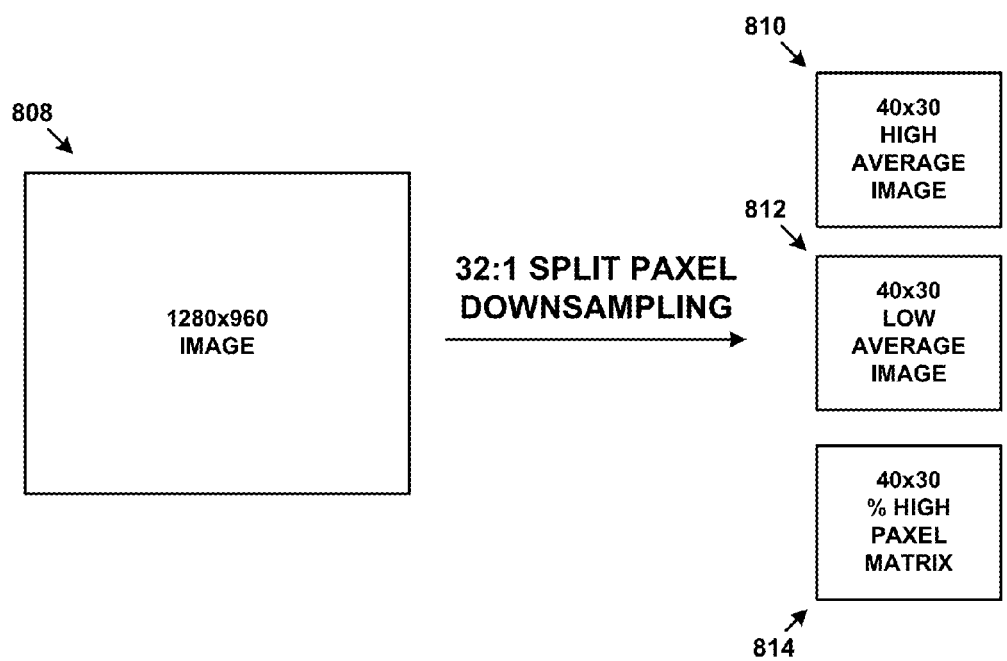
FIG. 8B also depicts split paxel downsampling, in accordance with an example embodiment.
Figure 8C:
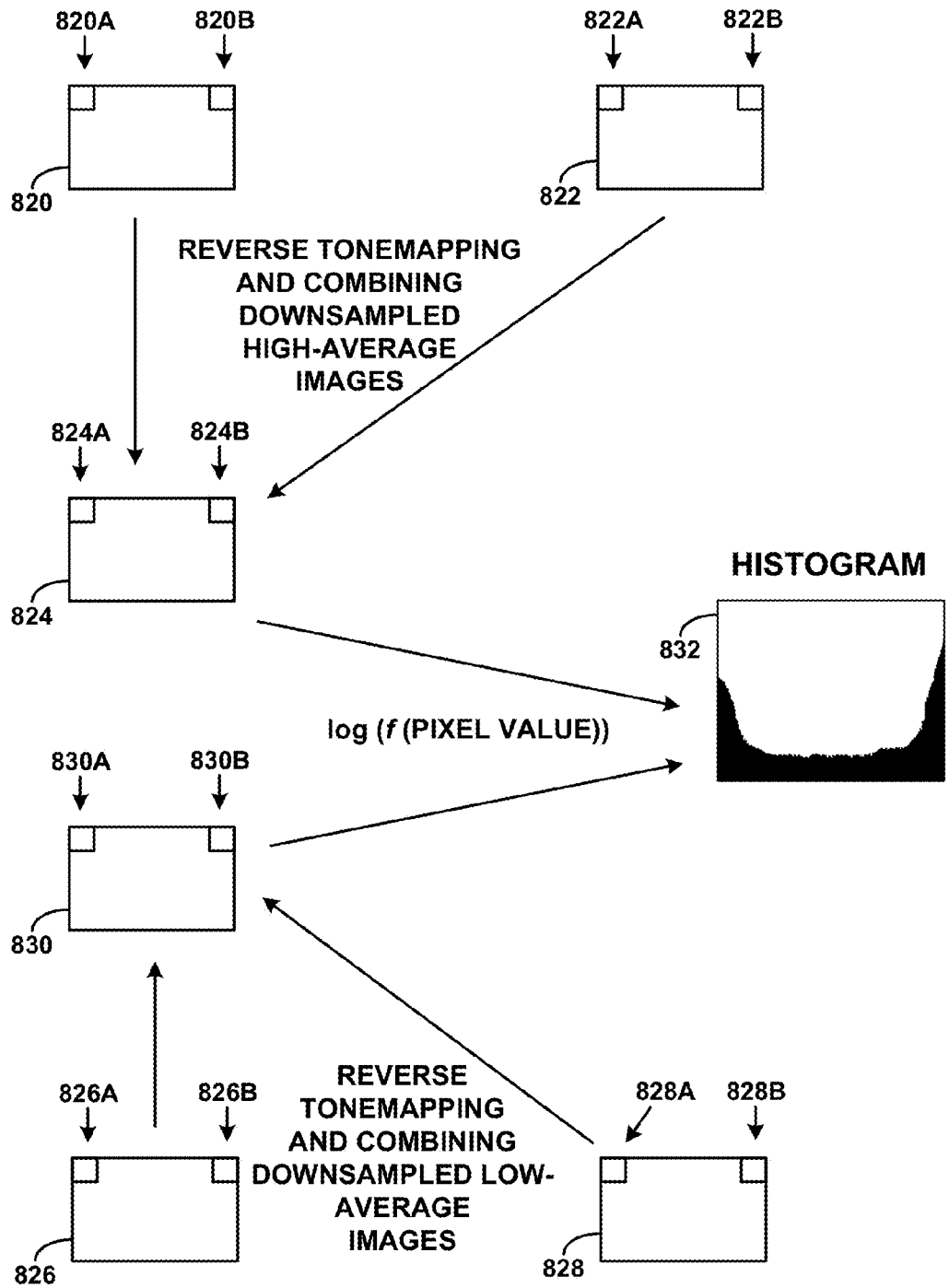
FIG. 8C depicts creating a histogram from one or more captured images, in accordance with an example embodiment.

FIGS. 8A, 8B, and 8C depict an alternative method of constructing a pixel-value histogram based on two or more images captured during first image capture 306. The procedures of FIGS. 8A, 8B, and 8C may be combined with or used in place of the procedures of FIG. 4A.

For instance, FIG. 8A depicts split paxel downsampling. As noted above, an i×j pixel block and its associated downsampled pixel may both be referred to as a "paxel." Pixel block 800 is an example of a paxel—a 3×2 pixel block containing pixel values. These pixel values may be one or more of the (R, G, B) values of the respective pixels, averages of the (R, G, B) values of the respective pixels, the luma (Y) values of the pixels in the YCbCr color space, or some other representation of the pixels. Regardless, the average of these six pixel values is 96.67.

In addition to determining the average pixel value as part of downsampling the six pixels of pixel block 800, the average value may also be used to "split" the pixels in the paxel into two groups. The first group consists of the pixels with a pixel value greater than or equal to the average pixel value, and the second group consists of the pixels with a pixel value less than the average pixel value. The average of the first group of pixel values may be calculated to determine high-average paxel 802, which has a value of 180. The average of the second group of pixel values may be calculated to determine low-average paxel 804, which has a value of 55. Additionally, a percentage (or fraction) of high pixels 806 may be determined by calculating the number of pixels in the first group divided by the total number of pixels in the paxel. In some embodiments, but not shown in FIG. 8A, a percentage (or fraction) of low pixels may be determined by calculating the number of pixels in the second group divided by the total number of pixels in the paxel. Alternatively, the percentage (or fraction) of low pixels may be determined by subtracting the percentage (or fraction) of high pixels 806 from 1.

Each paxel in a downsampled image may be represented by these three (or four) values. In this way, information about the structure of the paxel, such as the variance of the pixel values, may be retained. Additionally, whether the distribution is more heavily weighted above the average value or below the average value may also be represented by percentage (or fraction) of high pixels 806.

FIG. 8B depicts an example of 32:1 split paxel downsampling. Image 808 is a 1280×960 pixel image. Downsampling image 808 by a factor of 32 using split paxels results in a 40×30 high-average image 810, a 40×30 low-average image 812, and a 40×30 percentage of high pixels matrix 814. Thus, each pixel value in high-average image 810 and low-average image 812 may represent 1024 pixels (a 32×32 paxel) in image 810. Despite high-average image 810 and low-average image 812 being referred to as "images," high-average image 810 and low-average image 812 might not be viewed directly. Thus, alternatively, high-average image 810 and low-average image 812 may be referred to as "matrices." Though not shown in FIG. 8B, a percentage of low pixels matrix may also be generated.

FIG. 8C depicts constructing a histogram based on downsampled split paxel images. Images 820 and 822 may be downsampled high-average images derived from respective images captured during a metering burst. Images 826 and 828 may be downsampled low-average images derived from respective images of the same metering burst. For instance, image 820 and image 826 may be downsampled high-average and downsampled low-average images derived, respectively, from the same original, full-sized image in the metering burst. Similarly, image 822 and image 828 may be downsampled high-average and downsampled low-average images derived, respectively, from another original, full-sized image in the metering burst.

Not unlike the process described above in the context of FIG. 4A, images 820 and 822 may be reverse tonemapped and combined into combined high-average image 824. Thus, for each location in the downsampled high-average images (e.g., pixels 820A and 822A would be considered to be in the same location), the pixel with the highest value less than 255 may be selected. Possibly independently, images 826 and 828 may be reverse tonemapped and combined into combined high-average image 830. Thus, for each location in the downsampled low-average images (e.g., pixels 826A and 828A would be considered to be in the same location), the pixel with the highest value less than 255 may be selected. In other embodiments, a threshold pixel value different from 255 (e.g., 250, 245, or a threshold pixel value higher than 255) may be used instead.

Each pixel selected from one of high-average images 820 and 822 may be placed in its respective location in combined high-average image 824. Thus, for instance, pixel 820A may be placed as pixel 824A, and pixel 822B may be placed as pixel 824B. Additionally, the pixels selected for combined high-average image 824 may be reverse tonemapped. Similarly, each pixel selected from one of low-average images 826 and 828 may be placed in its respective location in combined high-average image 830. Thus, for instance, pixel 826A may be placed as pixel 830A, and pixel 828B may be placed as pixel 830B. The pixels selected for combined high-average image 824 may also be reverse tonemapped Further, the pixel values placed in each of combined high-average image 824 and combined low-average image 830 may be divided by the respective TET with which the non-downsampled pixels in their respective paxels were captured. Doing so may normalize the pixel values that were captured using various TETs to a particular range—for instance, the pixels of the various images may be placed into the same brightness units.

A histogram 832 may be created from combined high-average image 824 and combined low-average image 830. Histogram 832 may be an LDR histogram, HDR histogram, log HDR histogram, or some other type of histogram. While there are many ways in which the histogram can be formed, some embodiments may include evaluating a function of the pixel values of each pixel. For instance, if the pixel values are represented in the (R, G, B) color space, the function may take the average or maximum of the values of the (R, G, B) color channels.

Alternatively, multiple histograms may be constructed. For example, in the case of the (R, G, B) color space, one histogram for the R channel, one for the G channel, and one for the B channel may be created. If image pyramids are used, one histogram pyramid per color channel may be constructed.

Moreover, the logarithm of this function's output may also be taken, and the result may be used to locate a bin on the x axis of the histogram. The quantity added to this bin may be based on the pixels' associated percentage (or fraction) of high pixels or percentage (or fraction) of low pixels. For example, suppose that pixel 820A is associated with a percentage (or fraction) of high pixels of 0.73. Suppose further that pixel 820A is placed as pixel 824A. Then, once the histogram bin is determined for this pixel, the weight of 0.73 may be added to that bin. Similarly, suppose that pixel 828A is associated with a percentage (or fraction) of low pixels of 0.49. Suppose further that pixel 828A is placed as pixel 830A. Then, once the histogram bin is determined for this pixel, the weight of 0.49 may be added to that bin. In some embodiments, this weight may be further modified, perhaps by center weighted averaging or by some other technique.

In some embodiments, the processes of downsampling and merging the pixel information into histogram 832 may be performed together rather than sequentially. For instance, the pixel values for a particular pixel location in both combined high-average image 824 and combined low-average image 830 may be determined, and the associated weights may be added to histogram 832 before considering the next pixel location. Doing so might allow for further normalization of the weights if the high-average pixel in combined high-average image 824 was taken from one image, the low-average pixel in combined low-average image 830 was taken from another image, and the sum of their respective weights is not 1. Other orderings of the procedures illustrated by FIG. 8C are also possible, and may be included in alternative embodiments.

Histogram 832 may be compared to one or more reference histograms to determine TET values for a subsequent payload burst. For example, histogram 832 may be compared to each histogram stored in training image data 304. A pair of histograms can be compared in various ways, such as calculating the EMD between the pair of histograms. As discussed above, a weight w, perhaps taking on a value between 0 and 1, may be derived from the EMD for a particular pair of histograms.

For each pair of histograms (where a first histogram is histogram 832 and a second histogram is from an entry in training image database 304), the weight w may be applied to the respective scene type associated with the second histogram's entry in training image database 304. The result may be averaged over the pairs of histograms to determine an "HDR-ness" of the scene. For instance, if the resulting "HDR-ness" is at or above 0.5 on a scale of 0 to 1, then the scene may be designated for HDR processing, but if the resulting "HDR-ness" is below 0.5 on the same scale, then the scene may be designated for LDR processing. The embodiment described above is just one possible way of determining the brightness and "HDR-ness" of a scene. Other techniques could be used instead. For instance, the short and long TETs for a scene may be determined. If the difference between the short and long TETs (or the ratio of the long TET to the short TET) is less than or equal to a threshold value, the scene may be considered an LDR scene. If the difference between the short and long TETs (or the ratio of the long TET to the short TET) is greater than the threshold value, the scene may be considered an HDR scene.

In order to determine the TETs for the payload burst, the following example procedure may be used. However, other procedures may be used instead.

For each pair of histograms (again, where the first histogram is histogram 832 and a second histogram is from an entry in training image database 304), the weight w may be applied to the respective target pixel value associated with the second histogram's entry in training image database 304. The result may be averaged to determine a target average pixel value for the scene represented by histogram 832. Then, the procedure depicted in Table 1, or some other procedure, may be used to determine the TET to be used for subsequent image captures. If the scene type is HDR, two or more target average pixel values (and two or more respective TETs) may be determined. In some embodiments, the respective TETs may include a fallback TET. However, images might not be captured using the fallback TET unless the merge of short and long images captured during second image capture 314 fails. Alternatively, only the images captured during first image capture 306 may be used to form output image 316.

In particular, several variations may be supported by the embodiments herein. In one possible variation, a short TET and a long TET may be determined during image processing 308. Then, during second image capture 314, short and long images may be captured using the short and long TETs, respectively. If the alignment and/or merge of the combined short image and combined long image fails, either the combined short image or the combined long image may be provided as, or as at least part of, output image 316.

In another possible variation, a short TET, a long TET, and a fallback TET may be determined during image processing 308. Then, during second image capture 314, short, long, and fallback images may be captured using the short, long, and fallback TETs, respectively. If the alignment and/or merge of the combined short image and combined long image fails, one of the fallback images or a combined fallback image may be provided as, or as at least part of, output image 316. The combined fallback image may be constructed in a similar fashion as the combined short image and/or the combined long image.

In yet another possible variation, a short TET, a long TET, and a fallback TET may be determined during image processing 308. Then, during second image capture 314, only short and long images may be captured using the short and long TETs, respectively. If the alignment and/or merge of the combined short image and combined long image fails, either the combined short image or the combined long image may be selected and provided as, or as at least part of, output image 316. However, in this variation, if the fallback TET was greater than the TET of the selected combined image, then digital gain may be applied (e.g., a multiplication operation on the pixel values) to adjust the brightness of output image 316 to a brightness corresponding to the fallback TET. Thus, output image 316 may exhibit brightness commensurate with that of an image captured using the fallback TET.

Figure 9:
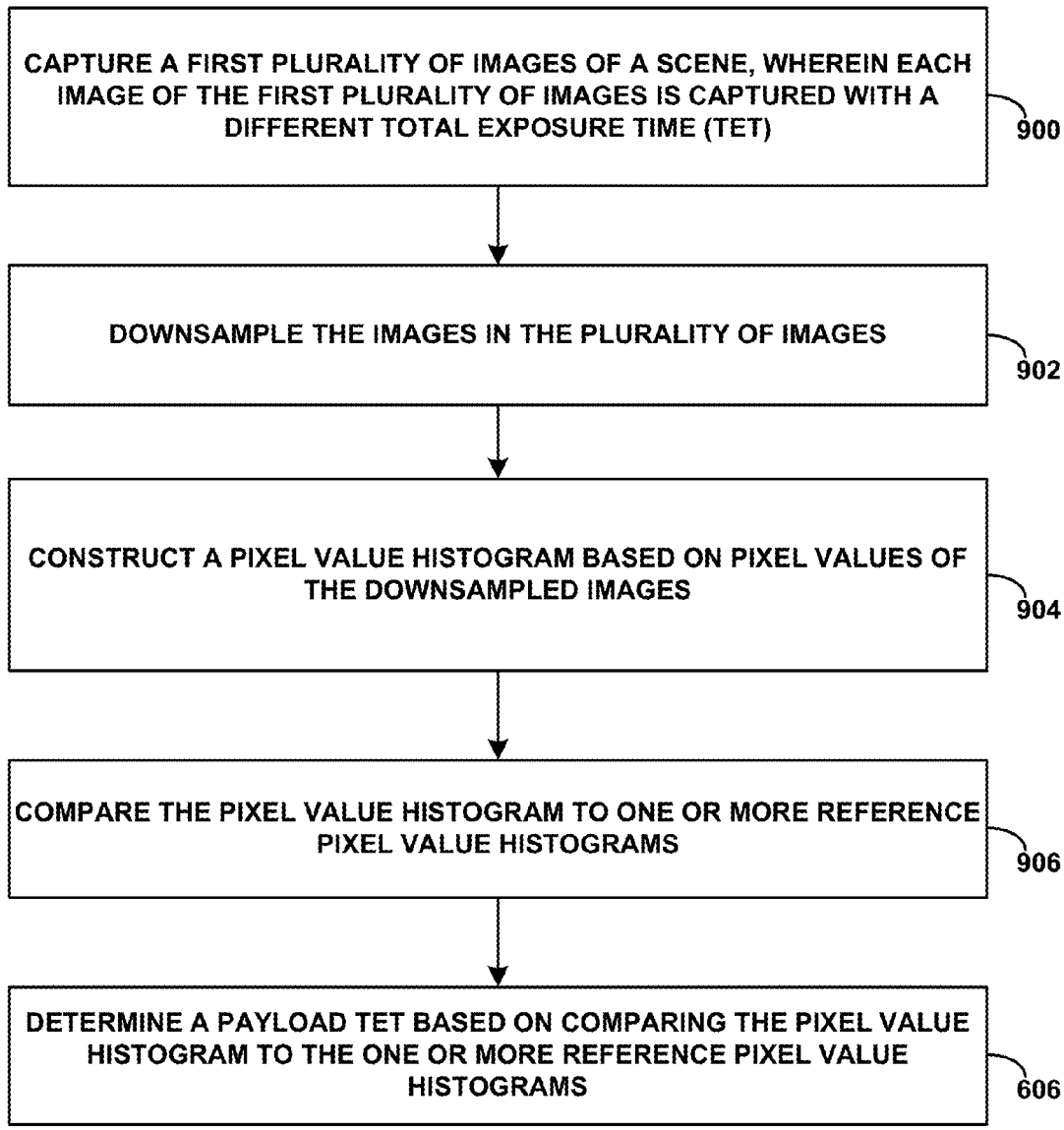
FIG. 9 depicts still another flow chart, in accordance with an example embodiment.

FIG. 9 depicts a flow chart, in accordance with an example embodiment. At step 900, a first plurality of images of a scene may be captured by an image sensor. Each image of the first plurality of images may be captured using a different TET. At step 902, the images in the plurality of images may be downsampled. At step 904, a pixel-value histogram based on pixel values of the downsampled images may be constructed.

At step 906, the pixel-value histogram may be compared to one or more reference pixel-value histograms. Comparing the pixel-value histogram to the one or more reference pixel-value histograms may involve determining, for the pixel-value histogram and each of the one or more reference pixel-value histograms, respective similarity metrics, and determining respective weights based on inverses of the similarity metrics. The one or more reference pixel-value histograms may be associated with respective target average pixel values, and the payload TET may be based on a sum of the respective weights applied to the respective target average pixel values.

At step 908, a payload TET may be determined based on comparing the pixel-value histogram to the one or more reference pixel-value histograms. At least one additional image of the scene may be captured using the payload TET.

In some embodiments, downsampling the images in the plurality of images may involve forming a plurality of high-average downsampled images and a second plurality of low-average downsampled images. Additionally, constructing the pixel-value histogram based on pixel values of the downsampled images may involve constructing the pixel-value histogram based on pixel values of the plurality of high-average downsampled images and the plurality of low-average downsampled images.

Forming each image of the plurality of high-average downsampled images may involve dividing each image in the plurality of high-average downsampled images into respective non-overlapping matrices of paxels, calculating average pixel values of each paxel, and calculating high-average pixel values of each paxel. Each paxel in the non-overlapping matrices of paxels may represent at least a pixel tile of the respective image in the plurality of images with a dimension of 1×2, 2×1, 2×2, or greater. The average pixel values may be respective average values of all pixels within the respective paxel, and the high-average pixel values may be respective average values of all pixels within the respective paxel with values greater than or equal to the average pixel value of the respective paxel.

Forming each image of the plurality of low-average downsampled images may involve calculating low-average pixel values of each paxel. The low-average pixel values may be respective average values of all pixels within the respective paxel with values less than the average pixel value of the respective paxel.

Downsampling the images in the plurality of images may further involve calculating respective high pixel fractions for each paxel and respective low pixel fractions for each paxel. The high pixel fractions may be respective ratios of (i) pixels within the respective paxel with values greater than or equal to the average pixel value of the respective paxel, to (ii) total pixels within the respective paxel. The low pixel fractions may be respective ratios of (i) pixels within the respective paxel with values less than the average pixel value of the respective paxel, to (ii) total pixels within the respective paxel.

Constructing the pixel-value histogram based on the pixel values of the downsampled images may involve combining images from the plurality of high-average downsampled images into a combined high-average downsampled image, and combining images from the plurality of low-average downsampled images into a combined low-average downsampled image. Combining images from first plurality of high-average downsampled images into the combined high-average downsampled image may involve, for each pixel location in the combined high-average downsampled image, selecting a high-average pixel value from the same pixel location in one of the high-average downsampled images. Combining images from the second plurality of low-average downsampled images into the combined low-average downsampled image may involve, for each pixel location in the combined low-average downsampled image, selecting a low-average pixel value from the same pixel location in one of the low-average downsampled images.

Constructing the pixel-value histogram based on the pixel values of the downsampled images may further include adding, to the pixel-value histogram, a first set of quantities representing each high-average pixel value in the combined high-average downsampled image and a second set of quantities representing each low-average pixel value in the combined low-average downsampled image. The quantities in the first set of quantities are based on the respective associated high pixel fractions. The quantities in the second set of quantities are based on the respective associated low pixel fractions.

The steps depicted in FIG. 9 may be carried out by a camera device, such as digital camera device 100, a computing device, such as computing device 200, and/or by two or more distinct devices. For instance, in some embodiments, the image capture step(s) may be performed by an image sensor and the remaining steps may be performed by a separate computing device. Other arrangements are possible. Further, the flow chart depicted in FIG. 9 may be modified according to the variations disclosed in this specification and/or the accompanying drawings.

Accordingly, an illustrative device, such those shown in FIGS. 1A to 1D, may use a first camera system to record video or for viewfinding, while using a second camera system to implements an auto-exposure process that includes or is based on the method illustrated in FIG. 9. For example, camera 112A of digital camera device 100 may be used to record video of a scene. While camera 112A is recording video of the scene, a digital camera device 100 may implement an auto-exposure process using camera 112B to build up an HDR histogram of the scene, and compare the histogram to reference data in order to provide mid-recording adjustments to the exposure used by camera 112A.

E. Autofocus

Generally, an autofocus (AF) system may include a sensor of some kind, a control system that automatically determines focus settings, and a motor to adjust the mechanical components of the camera (e.g., the lens) according to the focus settings. The data provided by the sensor may be used to evaluate the manner in which the environment is or will be recorded by an image sensor, and to responsively control an electro-mechanical system that can change the focus of camera (e.g., by using the motor to move components of the lens and/or changing the size of the aperture). Various types of autofocus techniques may be utilized by an image capture device, such as digital camera device 100.

Most consumer cameras include passive autofocus systems, which focus the lens on a subject by passively analyzing the image that is entering the optical system (e.g., they do not direct controlled beams of light on the subject in order to focus). Typical passive autofocus techniques include "phase detection" autofocus (PD-AF) and "contrast detection" autofocus (CD-AF), which may also be referred to as "contrast measurement" autofocus.

Passive autofocus processes typically involves a computing system (e.g., a processor) operating a mechanical lens system to adjust the focal settings of the lens (e.g., to change the focal distance), and then analyzing whether or not the resulting image from an autofocus sensor is in focus. If the resulting image is not satisfactorily in focus, then the computing system again adjusts the focal settings and evaluates the focal characteristics in the resulting image. In some implementations, each adjustment to the focal settings may be determined based on some measure of how out of focus the image is (or how out of focus a particular portion of the image is). In other implementations, the adjustments may be predetermined. In either case, this process may be repeated until the resulting image is deemed to be satisfactorily in focus.

As noted above, some cameras, such as DSLRs, may include dedicated autofocus systems, which may include one or more sensors that are dedicated to autofocus. Such cameras typically do not use the image sensor, which is used to capture images, for purposes of autofocus. Further, such cameras typically include PD-AF system, in which light received through the lens is split into a pair of images. Both of the images in the pair may then be directed onto the autofocus sensor and analyzed to determine whether or not the lens is in focus.

One common system PD-AF system is a second image registration (SIR), through-the-lens, phase detection system. An SIR PD-AF system utilizes a beam splitter to direct incoming light towards an autofocus sensor. More specifically, micro-lenses that are located on opposite sides of the lens may direct light from coming from the opposite sides of the lens towards the autofocus sensor, which effectively creates a rangefinder, with two images being projected onto the autofocus sensor. The images formed by the two micro-lenses are then compared to determine a separation error, which is evaluated to determine whether the lens is focused correctly. If the separation error indicates that the subject is out of focus (e.g., if the separation error is not zero or within some threshold from zero), then an adjustment to the focus settings may be calculated based on the separation error, and the lens may be moved according to the adjusted settings.

When size and/or cost of components are significant in the design of a device, the device may utilize a camera system that does not include a separate autofocus system. Such is the case with many mobile phones and/or tablet computers, which often include camera systems that use the same image sensor for both autofocus and image capture. In many cases, cameras in portable devices such as mobile phones and tablets use CD-AF for purposes of focusing.

While CD-AF systems can use a separate sensor that is dedicated to autofocus, most CD-AF systems use the same image sensor for both image capture and autofocus. CD-AF systems determine whether or not a subject is in focus by measuring the contrast in the image that is detected on the sensor. To do so, a CD-AF system may evaluate the change in contrast at various points in the image, with higher contrast being interpreted as an indication of a sharper image.

More specifically, the difference in intensity between adjacent pixels of a sensor is generally greater when the subject captured in the adjacent pixels is in focus, as compared to when image subject is out of focus. Further, a CD-AF system may measure the contrast at specific pixels, or determine the average over certain groups of pixels. In either case, a CD-AF system may then adjust focus settings until a threshold contrast is detected (and possibly until a maximum contrast is detected). For example, an illustrative CD-AF system may pass image data through a high pass filter, and adjusts the focus of the lens until the output from the filter exceeds a threshold (and possibly until the output of the filter is at its highest level).

The process of capturing multiple images of a scene with different focus settings may involve a focus sweep. When capturing a still photograph, a camera system may perform a focus sweep once, just before taking picture. When recording video, the camera system may perform focus sweeps continuously, or at least periodically. Notably, when a CD-AF system that utilizes the main image sensor performs a focus sweep while recording video, this can result in short segments of video that are noticeably out of focus. Note that the process of capturing multiple images of a scene with different focus settings may also involve minor focus hunting, in one direction or the other.

Accordingly, an illustrative device, such those shown in FIGS. 1A to 1D may use a first camera system to record video, while using a second camera system to implement CD-AF on behalf of the first camera system. For example, camera 112A of digital camera device 100 may be used to record video of a scene. While camera 112A is recording video of a scene, the digital camera device 100 may implement a CD-AF process using camera 112B, in order to determine and make mid-recording adjustments to the focus settings of camera 112A.

III. Illustrative Methods for a Device with Multiple Cameras

Figure 10A:
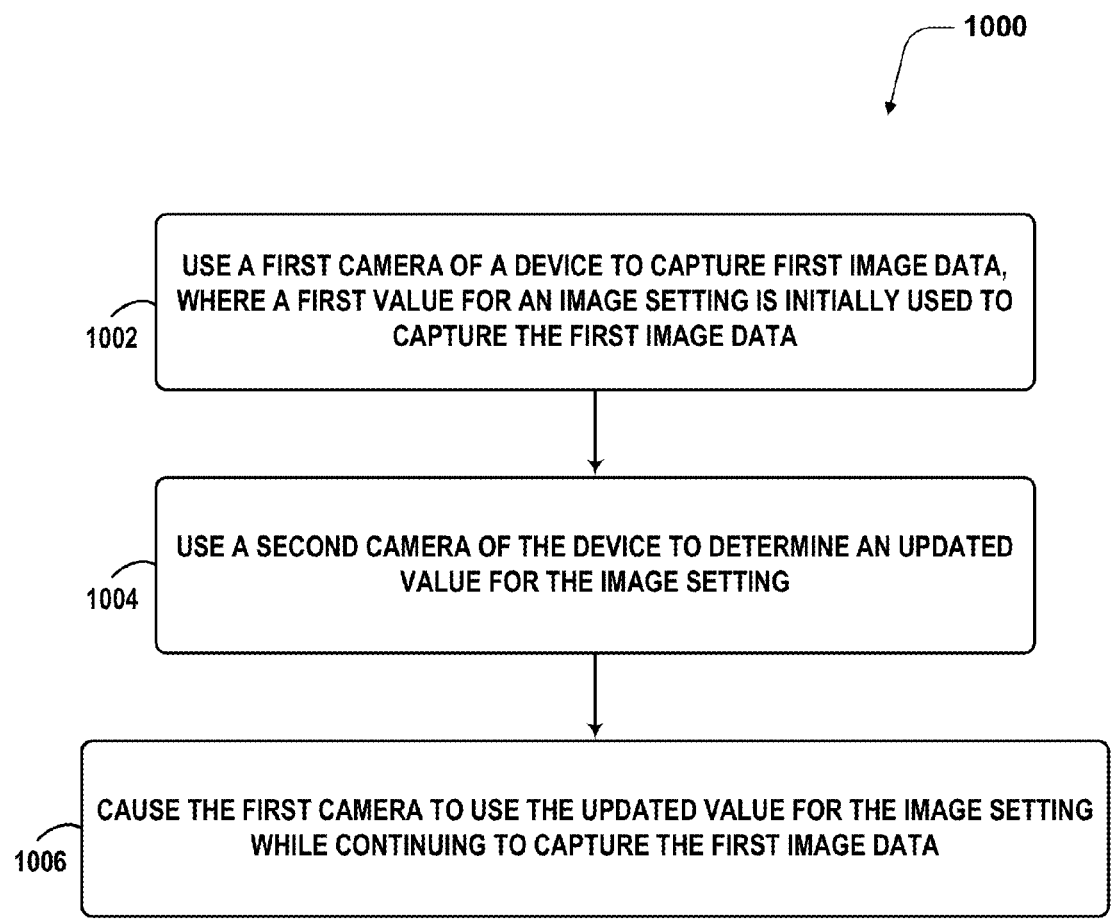
FIGS. 10A to 10C depict additional flow charts, in accordance with example embodiments.

FIG. 10A illustrates a method 1000 according to an example embodiment. More specifically, method 1000 involves a device using a first camera to capture first image data, where the first camera initially uses a first value for an image setting to capture the first image data, as shown by block 1002. Then, while the first camera is capturing the first image data, the device uses a second camera to determine an updated value for the image setting, where the first camera and the second camera are arranged on the device and are oriented in substantially the same direction, as shown by block 1004. The device then causes the first camera to use the updated value for the image setting to continue to capture the first image data, as shown by block 1006.

In another aspect, when a device includes three or more cameras, the device may use two or more cameras for image capture, while using the other camera or cameras to provide auto-focus, auto-exposure, and/or automatic white balance for all of the cameras that are being used for image capture.

Further, method 1000 may be implemented for various types of image capture. For example, a second camera may be used to update an image setting that is used by a first camera to capture video. As another example, a second camera may be used to update an image setting that is used by a first camera to generate image data for display in a viewfinder. Other examples are also possible.

In a further aspect, note that one or more cameras that are determining settings on another camera's behalf, could operate in a lower-power mode while determining the settings. For example, a secondary camera that is performing an autofocus process may use cropping to conserve power while doing so. As another example, a secondary camera that is performing an auto-exposure process may use techniques for binning or skipping of pixels to conserve power. Other examples of low-power techniques for determining various camera settings are also possible.

A. Using a Second Camera System for an Experiment-And-Adjust Process

Figure 10B:
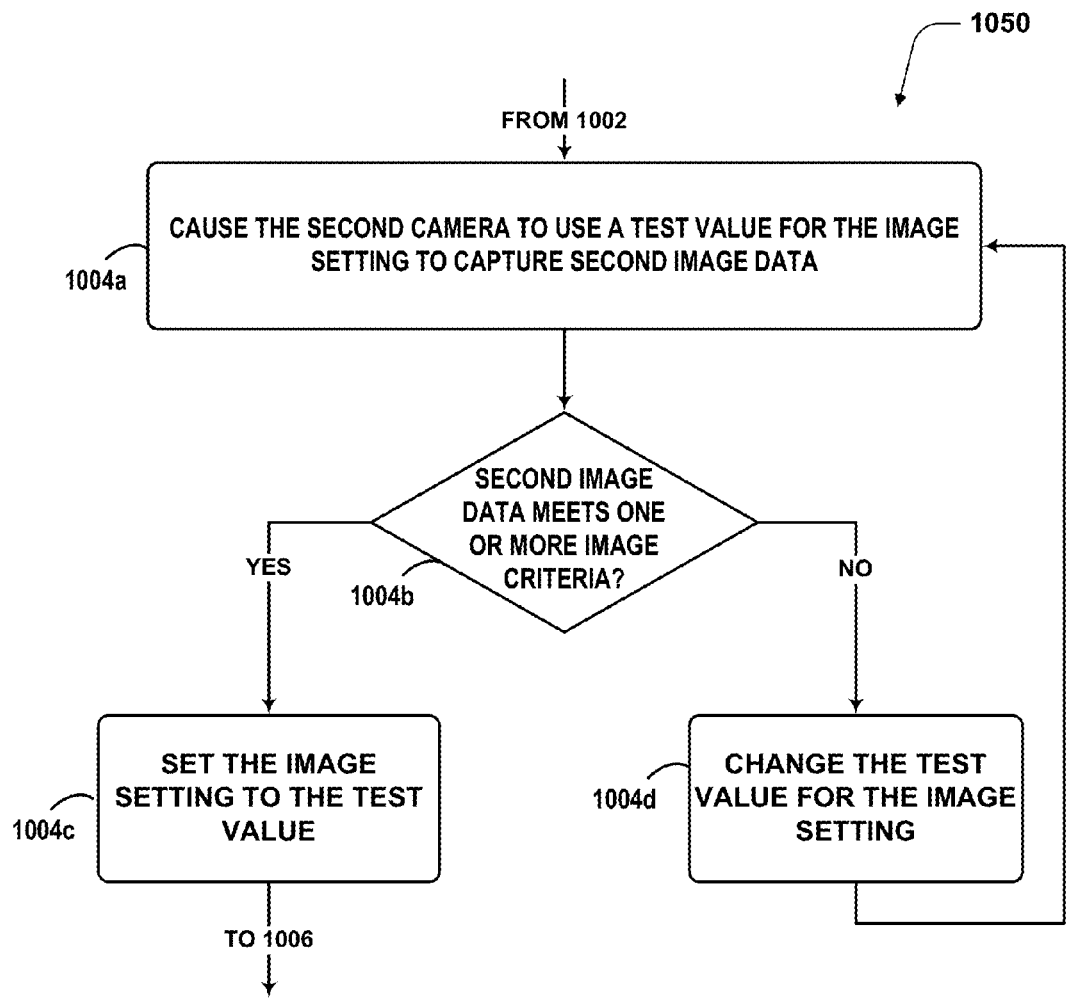

FIG. 10B illustrates a method 1050 that may be implemented by a device to use a second camera to determine the updated value for the image setting, such as at block 1004 of method 1000. In particular, the device may cause the second camera to use a test value for the image setting to capture second image data, as shown by block 1004a. The device may then determine whether or not the second image data satisfies one or more image criteria, as shown by block 1004b. If the second image data satisfies the one or more image criteria, then the device may set the image setting to the test value, as shown by block 1004c. Otherwise, the device may change the test value for the image setting, as shown by block 1004d. The device may then repeat blocks 1004a to 1004d until it is determined at block 1004c that the second image data meets the one or more criteria.

In some implementations, methods 1000 and 1050 may provide an autofocus process, which uses a second camera to adjust the focus for a first camera, while the first camera is recording video or viewfinding. For example, in order to provide autofocus while a first camera of a mobile device is capturing a video of a scene, a second camera of the mobile device may be used to perform one or more focal sweeps of the scene, such that the focal settings of the first camera can be adjusted. In some implementations, the focal sweeps may sweep through a larger number and/or range focal settings than if the same camera were performing the focal sweeps and capturing the video. In turn, the results of the autofocus process may improve. For example, when a second camera to perform autofocus for a first camera, the autofocus process may be more responsive to sudden or drastic changes in the scene. Further, this configuration may help to reduce, and possibly eliminate, the visible effects of focus hunting in video that is captured by the first camera.

In some embodiments, it may be assumed that the distance between the lens of the second image-capture system and the subject being focused on, is the same as the distance between the lens of the first image-capture system and the subject (or at least close enough for purposes of autofocus). In such an embodiment, the first image-capture system may simply use the focus setting that is determined by the second image-capture system (e.g., the setting(s) corresponding to the subject being in focus).

In other embodiments, the focus setting (e.g., the focal distance) that is determined using the second image-capture system, may be adjusted for use by the first image-capture system. For example, the focal setting determined using a second camera may be adjusted for a first camera according to the baseline between the first and second cameras (i.e., the distance between the two cameras). To do so, the distance from the lens of the first camera to the subject may be determined based on: (a) the distance and angle between the lens of the second camera and the subject, and (b) the baseline between the first and second camera. The focal distance used by the second camera may then be adjusted according to the ratio of the distance from the first camera's lens to the subject as compared to the distance from the second camera's lens to the subject, in order to determine the distance between the first camera's lens and the subject. The focus setting(s) for the first camera may then be set such that the focal distance of the first camera aligns with the distance between the subject and the first camera's lens. Other examples are also possible.

Additionally or alternatively, methods 1000 and 1050 may provide an auto-white-balance process, which uses a second image-capture system to determine white-balance settings for the first image-capture system, while the first image-capture system is recording video or viewfinding. In such embodiments, the second image-capture system may use any white-balancing process that is now known or later developed.

Further, methods 1000 and 1050 may provide an auto-exposure process, which uses a second image-capture system to determine the exposure for the first image-capture system. For example, a second camera may implement an auto-exposure process that adjusts the TET upwards or downwards until the average pixel value is equal to or deviates by less than a predetermined amount from a target average pixel value. Other examples are also possible.

B. Using a Second Camera for Model-Based Settings

In addition or in the alternative to iterative experiment-and-adjust processes, a computing device may use image data from a second camera system to make model-based updates to the settings for a first camera that is capturing image data. For instance, a second camera may be used for an auto-exposure process while a first camera is recording video.

Figure 10C:
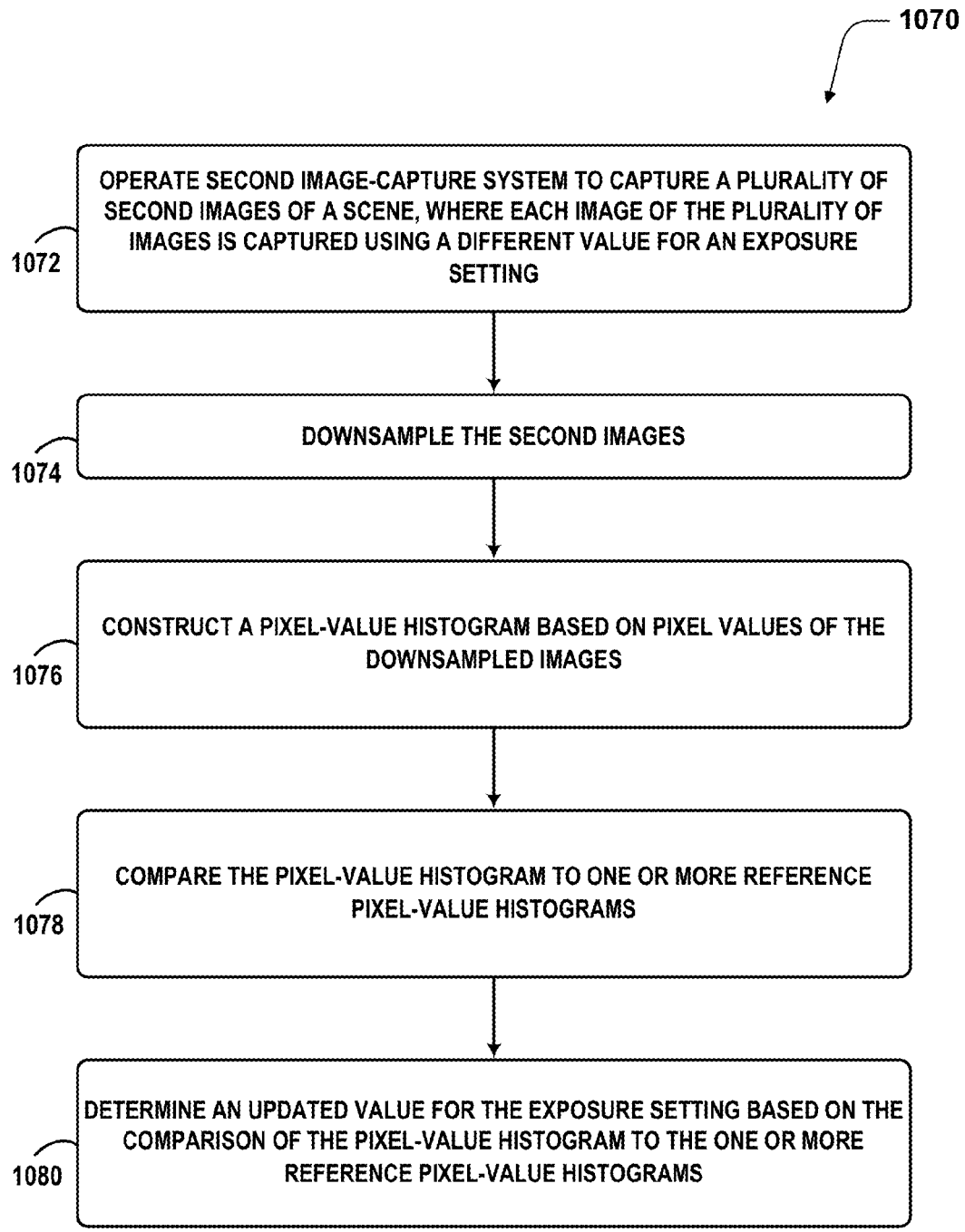

As a specific example, FIG. 10C illustrates a method 1070 that may be implemented by a device to use a second camera to provide data for a model-based auto-exposure process. Method 1070 may be implemented, for example, at block 1004 of method 1000. Further, method 1070 may be implemented repeatedly while a first camera of a device is recording a video of a scene, to use a second camera of the device to provide an auto-exposure process for the first camera.

By implementing method 1070, a mobile device's second camera may be used to capture image data from which the mobile device (or a remote device in communication with the mobile device) can progressively build an HDR histogram of the scene, which is updated as new image data, with different exposure settings, is captured by the second camera. The progressively-built histogram may be periodically, or possibly even continuously, compared to reference data, in order to provide mid-recording adjustments to the exposure of the first camera.

As shown by block 1072, method 1070 involves a computing device operating the second image-capture system to capture a plurality of second images of a scene, where each image of the plurality of images is captured using a different value for an exposure setting. At block 1074, the computing device downsamples the plurality of second images. The computing device may then construct a pixel-value histogram based on pixel values of the downsampled images, as shown by block 1076. Further, the computing device may compare the pixel-value histogram to one or more reference pixel-value histograms, as shown by block 1078. The computing device may then determine an updated value for the exposure setting based on the comparison of the pixel-value histogram to the one or more reference pixel-value histograms, as shown by block 1080.

In some embodiments, block 1080 may involve determining a TET for use by the first image-capture system to continue to capture the first image data. Accordingly, method 1070 may be repeated a number of times during a video recording by a first camera, in order that the TET used by the first camera to capture the video may be adjusted a number of times throughout the recording. Similarly, method 1070 may be repeated a number of times while a first camera is capturing image data for presentation in a viewfinder, such that the TET of the first camera may be adjusted a number of times while capturing image data for the viewfinder.

In a further aspect, at block 1078, a comparison of the pixel-value histogram to the one or more reference pixel-value histograms may be accomplished using various techniques. For example, the comparison of the pixel value histogram to the one or more reference pixel value histograms may involve determining, for the pixel value histogram and each of the one or more reference pixel value histograms, respective similarity metrics, and determining respective weights based on inverses of the similarity metrics. The one or more reference pixel value histograms may be associated with respective target average pixel values, and the TET may be determined, at block 1080, based on a sum of the respective weights applied to the respective target average pixel values. The TET for the first camera may then be updated accordingly.

In some embodiments, downsampling the images in the plurality of images may involve forming a plurality of high-average downsampled images and a second plurality of low-average downsampled images. Additionally, constructing the pixel value histogram based on pixel values of the downsampled images may involve constructing the pixel value histogram based on pixel values of the plurality of high-average downsampled images and the plurality of low-average downsampled images.

Forming each image of the plurality of high-average downsampled images may involve dividing each image in the plurality of high-average downsampled images into respective non-overlapping matrices of paxels, calculating average pixel values of each paxel, and calculating high-average pixel values of each paxel. Each paxel in the non-overlapping matrices of paxels may represent at least a pixel tile of the respective image in the plurality of images with a dimension of 1×2, 2×1, 2×2, or greater. The average pixel values may be respective average values of all pixels within the respective paxel, and the high-average pixel values may be respective average values of all pixels within the respective paxel with values greater than or equal to the average pixel value of the respective paxel.

Forming each image of the plurality of low-average downsampled images may involve calculating low-average pixel values of each paxel. The low-average pixel values may be respective average values of all pixels within the respective paxel with values less than the average pixel value of the respective paxel.

Downsampling the images in the plurality of images may further involve calculating respective high pixel fractions for each paxel and respective low pixel fractions for each paxel. The high pixel fractions may be respective ratios of (i) pixels within the respective paxel with values greater than or equal to the average pixel value of the respective paxel, to (ii) total pixels within the respective paxel. The low pixel fractions may be respective ratios of (i) pixels within the respective paxel with values less than the average pixel value of the respective paxel, to (ii) total pixels within the respective paxel.

Constructing the pixel value histogram based on the pixel values of the downsampled images may involve combining images from the plurality of high-average downsampled images into a combined high-average downsampled image, and combining images from the plurality of low-average downsampled images into a combined low-average downsampled image. Combining images from first plurality of high-average downsampled images into the combined high-average downsampled image may involve, for each pixel location in the combined high-average downsampled image, selecting a high-average pixel value from the same pixel location in one of the high-average downsampled images.

Combining images from the second plurality of low-average downsampled images into the combined low-average downsampled image may involve, for each pixel location in the combined low-average downsampled image, selecting a low-average pixel value from the same pixel location in one of the low-average downsampled images.

Constructing the pixel value histogram based on the pixel values of the downsampled images may further include adding, to the pixel value histogram, a first set of quantities representing each high-average pixel value in the combined high-average downsampled image and a second set of quantities representing each low-average pixel value in the combined low-average downsampled image. The quantities in the first set of quantities are based on the respective associated high pixel fractions. The quantities in the second set of quantities are based on the respective associated low pixel fractions.

Note that the split-paxel technique above, which utilizes high-average and low-average pixel values, is just one way of building the pixel value histogram. In other cases, the split-paxel technique described above may be omitted, and a histogram may be created directly from the downsampled image. Other techniques for generating a pixel value histogram are also possible.

Note that the use of a second camera for an auto-exposure process, such as method 1070, may allow for significant experimentation with the exposure, which may improve the results of the auto-exposure process. Further, since the histogram of the scene may be progressively built during a video recording, the histogram may improve as the video recording progresses. Therefore, the results of the auto-exposure process may also improve the longer a recording of a scene lasts.

C. Using One or More Additional Cameras to Update Multiple Image Settings for a First Camera In some embodiments, a device may use an example method, such as method 1000, to adjust two or more image settings. Method 1000 or portions thereof may be implemented for each of two or more different types of image settings. As such, all of the two or more different types of image settings may be updated for a first-image capture system, while the first image-capture system is capturing the first image data of the scene.

As a specific example, one or more second cameras on a device may be used to concurrently update both a focal setting and an exposure setting for a first camera on the same device, while the first camera device is capturing image data (e.g., recording video or capturing a burst of still images). As another specific example, one or more second cameras on a device may be used to update a near-field focus setting and a far-field focus setting for a first camera on the same device, while the first camera device is capturing image data. For example, a second camera could perform focus sweeps or focus hunting at distances that are further from a device, and a third camera could perform focus sweeps or focus hunting at distances that are nearer to the device, while a first camera is capturing video.

Further, note that one or more second cameras on a device could also be used to concurrently update multiple settings (e.g., a focal setting and an exposure setting) for two or more other cameras on the same device that are concurrently capturing image data. For example, a first camera could perform an AF process and a second camera could simultaneously perform an auto-exposure process in order to adjust the focus and exposure settings for both a third camera and a fourth camera that are capturing stereo video (e.g., to create 3D video footage). Other examples are also possible.

In some embodiments, the device may use one secondary camera to update multiple image settings for a first camera that is recording video. For instance, method 1000 may further involve the computing device alternating between: (a) operating the second image-capture system to update the first image setting for the first image-capture system and (b) operating the second image-capture system to update the second image setting.

As an example, while the first camera is recording a video, a computing device may switch back and forth between: (a) using a second camera to determine a focal setting for the first camera and (b) using the same second camera to determine an exposure setting for the first camera.

As another example, while the first camera is recording a video, a computing device may switch back and forth between: (a) using a second camera to determine a focal setting for the first camera and (b) using the same second camera to determine a white-balance setting for the first camera.

And, as yet another example, while the first camera is recording a video, a computing device may rotate between: (a) using a second camera to determine a focal setting for the first camera, (b) using the same second camera to determine a white-balance setting for the first camera, and (c) using the same second camera to determine an exposure setting for the first camera. Other examples are also possible.

In some embodiments, example methods may be implemented by a device that includes three or more cameras. In such a device, two or more additional cameras can be used to update simultaneously update different image settings for a first camera that is recording video. As such, method 1000 may further involve, while the first image-capture system is capturing the first image data: (a) operating, by the computing device, the third image-capture system to determine an updated value for the second image setting and (b) sending an instruction to the first image-capture system that indicates to use the updated value for the second image setting to continue to capture the first image data.

As an example, when the first camera is recording video, a second camera may be used to determine focus settings for the first camera (e.g., for autofocusing), while the third camera may be simultaneously used to determine exposure settings for the first camera (e.g., for auto-exposure). As another example, while the first camera is recording a video, a computing device may simultaneously: (a) use a second camera to update the focus of the first camera, (b) use a third camera to update white balancing for the first camera, and (c) use a fourth camera to update the exposure of the first camera. Other examples are also possible. Further, note that such functionality may be implemented by a set of cameras in an array configuration, which are all capturing image data. However, other configurations are also possible.

Further, when a device includes three or more cameras, one camera may determine a setting or settings for use by two or more of the other cameras. For example, a first camera on a device may perform an autofocus process, an auto-exposure process, and/or an auto-white-balance process, on behalf of two or more other cameras on the device. Other examples are also possible.

IV. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
operating, by a computing device, a first image-capture system to capture first image data of a scene, wherein the first image-capture system initially uses a first value for a first image setting to capture the first image data; and
while the first image-capture system is capturing the first image data:
operating, by the computing device, a second image-capture system to determine an updated value for the first image setting, wherein the first image-capture system and the second image-capture system are arranged on a given device and oriented in substantially the same direction; and
sending an instruction to the first image-capture system that indicates to use the updated value for the first image setting to continue to capture the first image data;
wherein the first image setting comprises an exposure time for the first image-capture system, and
wherein operating the second image-capture system to determine the updated value for the first image setting comprises:
(i) operating the second image-capture system to capture a second plurality of images of the scene, wherein each of the second plurality of images is captured using a different exposure time;
(ii) constructing a pixel-value histogram from the plurality of second images of the scene,
(iii) comparing the pixel value histogram to each of a plurality of reference pixel-value histograms to determine, for the pixel-value histogram and each of the reference pixel-value histograms, a respective similarity metric;
(iv) determining respective weights for each of the plurality of reference pixel-value histograms based on the respective similarity metrics; and
(v) determining an exposure time for use by the first camera system, based on the respective weights of the reference pixel-value histograms.

2. The method of claim 1, wherein determining the exposure time comprises determining a total exposure time (TET) for use by the first image-capture system to continue to capture the first image data.

3. The method of claim 1, wherein comparing the pixel-value histogram to each of the plurality of reference pixel-value histograms comprises:
determining, for the pixel-value histogram and each of the one or more reference pixel-value histograms, respective similarity metrics; and
determining respective weights based on inverses of the similarity metrics.

4. The method of claim 3, wherein the plurality of reference pixel-value histograms are associated with respective target average pixel values, and wherein the updated value for the exposure setting is determined based on a sum of the respective weights applied to the respective target average pixel values.

5. The method of claim 1, wherein operating the second image-capture system to determine an updated value for the first image setting further comprises:
(a) causing the second image-capture system to capture second image data using a test value for the first image setting;
(b) determining whether or not the second image data satisfies one or more image criteria;
(c) if the second image data satisfies the one or more criteria, then setting the first image setting to the test value; and
(d) otherwise, changing the test value for the first image setting, and then repeating (a) through (d) until it is determined at (c) that the second image data meets the one or more criteria.

6. The method of claim 1, wherein the first image data comprises video.

7. The method of claim 1, wherein the first image data comprises image data for display in a viewfinder.

8. The method of claim 1, wherein the first image setting comprises an exposure setting.

9. The method of claim 1, further comprising performing the method of claim 1 in order to update each of two or more image settings for the first-image capture system while the first image-capture system is capturing the first image data of the scene, wherein the two or more image settings comprise the first image setting and a second image setting.

10. The method of claim 1, wherein the second image-capture system is initially configured to capture still images, and wherein the method further comprises:
before starting to capture the first image data using the first image-capture system, reconfiguring the second image-capture system to determine updates for the first image setting on behalf of the first image-capture system.

11. The method of claim 9, wherein the computing device alternates between: (a) operating the second image-capture system to update the first image setting and (b) operating the second image-capture system to update the second image setting.

12. The method of claim 9, wherein a third image-capture system is also arranged on the given device and oriented in substantially the same direction as both the first and second image-capture systems, and wherein the method further comprises:
while the first image-capture system is capturing the first image data:
operating, by the computing device, the third image-capture system to determine an updated value for the second image setting; and
sending an instruction to the first image-capture system that indicates to use the updated value for the second image setting to continue to capture the first image data.

13. The method of claim 9, wherein the two or more image settings comprise a focus setting and the exposure time.

14. The method of claim 9, wherein the two or more image settings comprise a near-field focus setting and a far-field focus setting.

15. The method of claim 9, wherein the first image setting comprises a focus setting, and wherein the second image setting comprises the exposure time.

16. A system comprising:
two or more image-capture systems that comprise at least a first and second image-capture systems, wherein the first and second image-capture systems are oriented in substantially the same direction;
a control system configured to:
initially operate the first image-capture system to capture first image data using a first value for a first image setting; and while the first image-capture system is capturing the first image data:
   operate the second image-capture system to determine an updated value for the first image setting; and
   cause the first image-capture system to use the updated image value for the first image setting to continue to capture the first image data
wherein the first image setting comprises an exposure time for the first image-capture system, and
wherein, to operate of the second image-capture system to determine the updated value for the first image setting, the control system is configured to:
   (i) operate the second image-capture system to capture a second plurality of images of the scene, wherein each of the second plurality of images is captured using a different exposure time;
   (ii) construct a pixel-value histogram from the plurality of second images of the scene,
   (iii) compare the pixel value histogram to each of a plurality of reference pixel-value histograms to determine, for the pixel-value histogram and each of the reference pixel-value histograms, a respective similarity metric;
   (iv) determine respective weights for each of the plurality of reference pixel-value histograms based on the respective similarity metrics; and
   (v) determine an exposure time for use by the first camera system, based on the respective weights of the reference pixel-value histograms.

17. The system of claim 16, wherein the determined value for the exposure time comprises a total exposure time (TET) for use by the first image-capture system to continue to capture the first image data.

18. The system of claim 16, wherein, to operate of the second image-capture system to determine the updated value for the first image setting, the control system is further configured to:
   (a) operate the second image-capture system to capture second image data of the scene using a test value for the image setting;
   (b) determine whether or not the second image data satisfies one or more image criteria;
   (c) if the second image data satisfies the one or more criteria, then set the image setting to the test value; and
   (d) otherwise, change the test value for the image setting and repeat (a) through (d) until it is determined that the second image data meets the one or more criteria.

19. The system of claim 16, wherein the first image data comprises video.

20. The system of claim 16, wherein the system is a mobile device, and wherein the first and the second image-capture system are arranged at a corner of a first surface of the mobile device.

21. The system of claim 16, wherein the system is a mobile device, and wherein the mobile device includes four image-capture systems that are oriented in the same direction, wherein two of the four image-capture systems are arranged at a first corner of a first surface of the mobile device, and wherein a third and a fourth of the four image-capture systems are arranged at a second and third corner of the first surface, respectively.

22. The system of claim 16, wherein the system is a mobile device, and wherein the mobile device includes four image-capture systems that are oriented in the same direction, wherein one of the four image-capture systems is arranged at each of four corners of a first surface of the mobile device.

23. A non-transitory computer readable medium having stored therein instructions executable by a computing device to cause the computing device to perform functions comprising:
operating a first image-capture system to capture first image data of a scene, wherein the first image-capture system initially uses a first value for a first image setting to capture the first image data; and
while the first image-capture system is capturing the first image data:
   operating a second image-capture system to determine an updated value for the first image setting, wherein the first image-capture system and the second image-capture system are arranged on a given device and oriented in substantially the same direction; and
   sending an instruction to the first image-capture system that indicates to use the updated value for the first image setting to continue to capture the first image data;
wherein the first image setting comprises an exposure time for the first image-capture system, and
wherein operating the second image-capture system to determine an updated value for the first image setting comprises:
   (i) operating the second image-capture system to capture a second plurality of images of the scene, wherein each of the second plurality of images is captured using a different exposure time;
   (ii) constructing a pixel-value histogram from the plurality of second images of the scene,
   (iii) comparing the pixel value histogram to each of a plurality of reference pixel-value histograms to determine, for the pixel-value histogram and each of the reference pixel-value histograms, a respective similarity metric;
   (iv) determining respective weights for each of the plurality of reference pixel-value histograms based on the respective similarity metrics; and
   (v) determining an exposure time for use by the first camera system, based on the respective weights of the reference pixel-value histograms.

24. The non-transitory computer readable medium of claim 23, wherein determining a value for the exposure time comprises determining a total exposure time (TET) for use by the first image-capture system to continue to capture the first image data.

* * * * *